United States Patent
Gil

(10) Patent No.: US 11,829,136 B2
(45) Date of Patent: Nov. 28, 2023

(54) ASSET DELIVERY SYSTEM

(71) Applicant: United Parcel Service of America, Inc., Atlanta, GA (US)

(72) Inventor: Julio Gil, Veldhoven (NL)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 429 days.

(21) Appl. No.: 16/731,560

(22) Filed: Dec. 31, 2019

(65) Prior Publication Data

US 2021/0200210 A1    Jul. 1, 2021

(51) Int. Cl.
| | |
|---|---|
| *G06Q 50/28* | (2012.01) |
| *G05D 1/00* | (2006.01) |
| *G06Q 10/0832* | (2023.01) |
| *G06Q 10/0833* | (2023.01) |
| *G06Q 10/0835* | (2023.01) |
| *G06Q 10/087* | (2023.01) |

(52) U.S. Cl.
CPC ......... *G05D 1/0088* (2013.01); *G06Q 10/087* (2013.01); *G06Q 10/0832* (2013.01); *G06Q 10/0833* (2013.01); *G06Q 10/08355* (2013.01); *G06Q 50/28* (2013.01); *G05D 2201/0213* (2013.01)

(58) Field of Classification Search
CPC .................. B60P 3/007; G05D 1/0088; G05D 2201/0213; G06Q 10/0832; G06Q 10/0833; G06Q 10/08355; G06Q 10/087; G06Q 50/28

See application file for complete search history.

(56) References Cited

U.S. PATENT DOCUMENTS

| | | | | | |
|---|---|---|---|---|---|
| 5,569,003 | A | * | 10/1996 | Goldman | B44B 3/009 221/124 |
| 5,806,712 | A | * | 9/1998 | Siemsen | G07F 11/28 221/67 |
| 6,431,398 | B1 | * | 8/2002 | Cook | G07F 11/04 221/124 |
| 9,718,564 | B1 | * | 8/2017 | Beckman | B61L 23/00 |
| 2004/0251267 | A1 | * | 12/2004 | Chirnomas | G07F 11/14 221/278 |
| 2006/0102645 | A1 | * | 5/2006 | Walker | G06Q 30/0223 221/75 |

(Continued)

FOREIGN PATENT DOCUMENTS

| | | |
|---|---|---|
| EP | 3228496 A2 | 10/2017 |
| GB | 2568768 A | 5/2019 |

OTHER PUBLICATIONS

Arcade Matt, Keymaster Arcade Game Secret *Revealed* & How to Win!, https://www.youtube.com/watch?v=CNQ4nRNmQmE (Year: 2018).*

(Continued)

*Primary Examiner* — Hunter B Lonsberry
*Assistant Examiner* — Matthew J. Reda
(74) *Attorney, Agent, or Firm* — SHOOK, HARDY & BACON L.L.P.

(57) ABSTRACT

An apparatus may automatically move one or more assets to or from one or more storage units to or from a delivery bot. The apparatus and the one or more storage units and the delivery bot may be stored in a logistics vehicle. The delivery bot may be configured to deliver or pick up the one or more assets to or from one or more delivery or pickup locations that are outside of the logistics vehicle.

19 Claims, 12 Drawing Sheets

(56) References Cited

U.S. PATENT DOCUMENTS

| | | |
|---|---|---|
| 2006/0162293 A1* | 7/2006 | Ilch .................. B65B 35/16 |
| | | 53/251 |
| 2014/0277691 A1* | 9/2014 | Jacobus ............ G06Q 10/087 |
| | | 700/216 |
| 2019/0143872 A1 | 5/2019 | Gil |
| 2019/0210799 A1* | 7/2019 | Kropp .................. G07F 11/62 |
| 2020/0026281 A1* | 1/2020 | Xiao ................ G06Q 10/0832 |
| 2020/0074404 A1 | 3/2020 | Gil, Jr. et al. |
| 2020/0209865 A1* | 7/2020 | Jarvis .............. G06Q 10/08355 |

OTHER PUBLICATIONS

International Search Report and written Opinion received for PCT Patent Application No. PCT/US2020/057481, dated Feb. 12, 2021, 13 pages.

\* cited by examiner

ASSET DELIVERY SYSTEM

BACKGROUND

Before an asset (e.g., a package or parcel) is delivered to a consignee or recipient, it may go through various operations. For instance, after a package has been dropped off at a carrier store for a delivery request, it may be routed to a sorting facility where the package is organized based on information associated with the package (e.g., size of package, destination address, etc.). After traversal of the package through the sorting facility, the package may be loaded into a carrier vehicle for delivery to its delivery destination. When the carrier vehicle reaches the delivery destination, carrier personnel may manually pick the package from the carrier vehicle and deliver the package to a consignee.

Typical asset delivery system technologies and vehicle technologies in general include static components and are limited in functionality. For example, typical carrier vehicles may only contain shelving carts that are configured to passively store packages and may not include any other components or functionality associated with asset delivery or pickup. In another example, typical loading devices for loading assets may be static such that they require extensive manual human operator intervention. As described in more detail herein, aspects improve these typical asset delivery system technologies and vehicle technologies.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. Further, alternative or additional embodiments exist other than those described in this summary section.

Some embodiments are directed to an apparatus for loading one or more shipment assets to a delivery bot. In some aspects, the apparatus includes one or more asset loading components configured to move one or more assets from one or more storage units to a delivery bot. In some aspects, the one or more asset loading components and the one or more storage units and the delivery bot are included in a logistics vehicle. In some aspects, the delivery bot is configured to deliver the one or more assets outside of the logistics vehicle to one or more delivery locations in response to the moving of the one or more assets. The apparatus may also include one or more sensors configured to automatically guide the one or more asset loading components to the one or more assets for the moving of the one or more assets from the one or more storage units to the delivery bot.

Some embodiments are directed to a system that includes a logistics vehicle, an apparatus, and a launch component. In some aspects, the logistics vehicle includes one or more storage units. In some aspects, the logistics vehicle is configured to carry one or more assets for one or more shipping operations. In some aspects, the apparatus is included in the logistics vehicle. In some aspects, the apparatus includes one or more asset loading components configured to automatically move the one or more assets to or from the one or more storage units to or from a delivery bot inside of the logistics vehicle. In some aspects, the delivery bot is configured to deliver the one or more assets to or from one or more delivery or pickup locations outside of the logistics vehicle. In some aspects, the launch component is inside of the logistic vehicle. In some aspects, the launch component is configured to allow the delivery bot to traverse outside of the logistics vehicle or inside of the logistics vehicle in order to complete the one or more shipping operations.

Some embodiments are directed to a method for loading one or more shipment assets to or from a delivery bot. In some aspects, the method includes automatically moving, by an apparatus, one or more assets to or from one or more storage units to or from a delivery bot. In some aspects, the apparatus and the one or more storage units and the delivery bot are stored in a logistics vehicle. In some aspects, the delivery bot is configured to deliver or pick up the one or more assets to or from one or more delivery or pickup locations that are outside of the logistics vehicle.

BRIEF DESCRIPTION OF THE DRAWINGS

Figure 1:
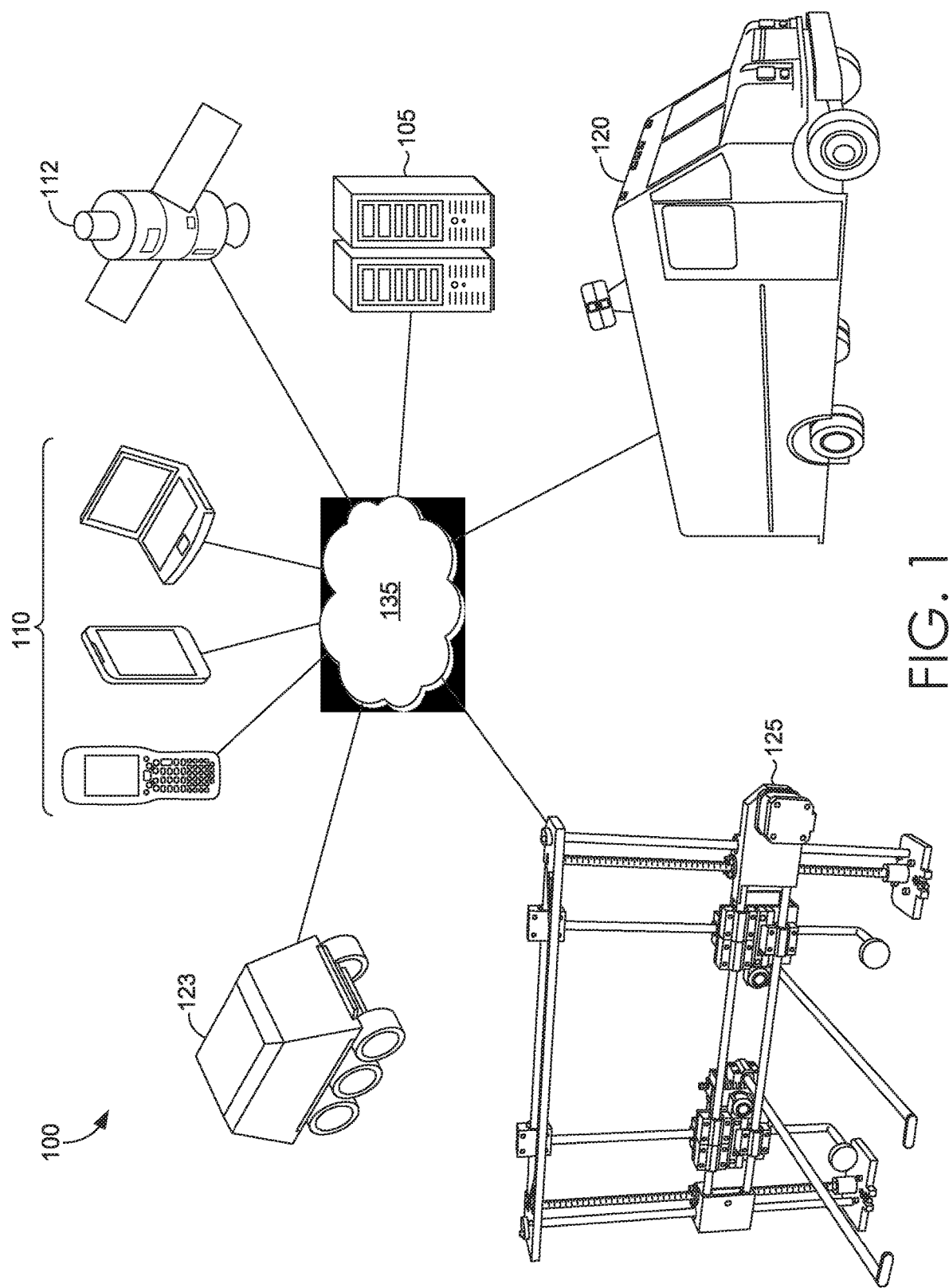

Having thus described the disclosure in general terms, reference will now be made to the accompanying drawings, which are not necessarily drawn to scale, and wherein:

FIG. 1 is a schematic diagram of an example computing environment in which aspects of the present disclosure are employed in, according to some embodiments.

Figure 2:
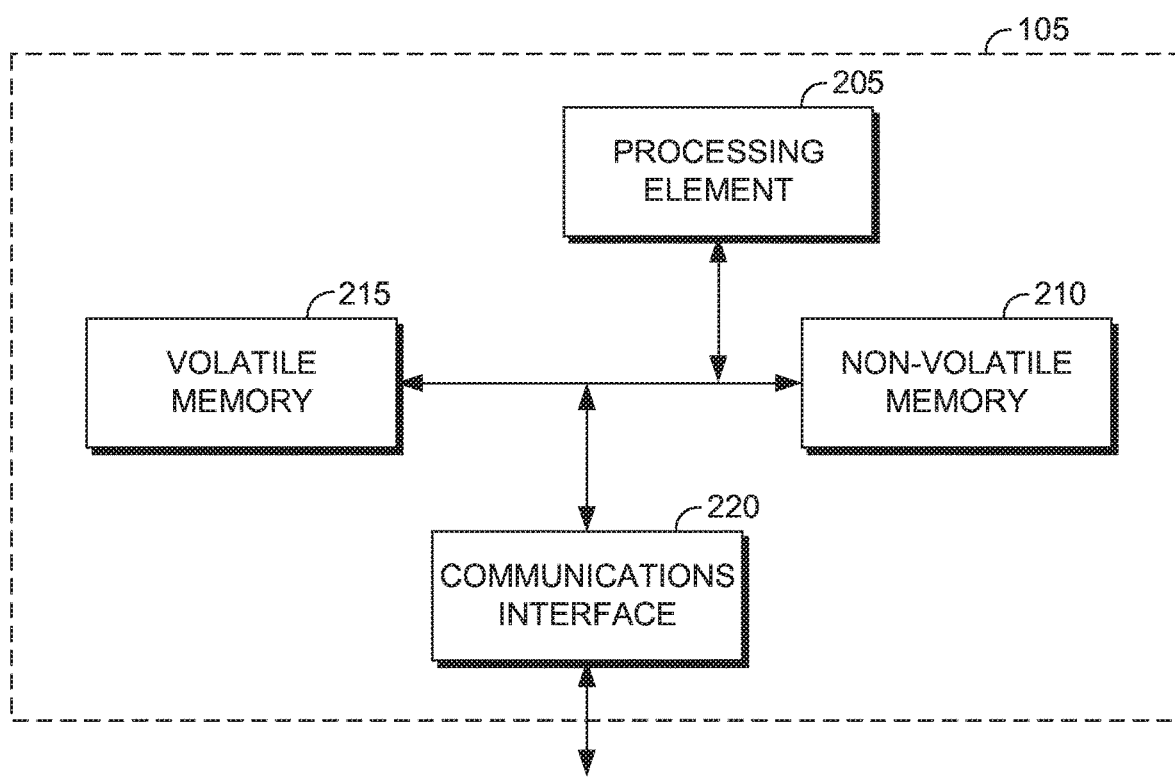

FIG. 2 is a schematic diagram of one or more logistics server(s) in which aspects of the present disclosure are employed in, according to some embodiments.

Figure 3:
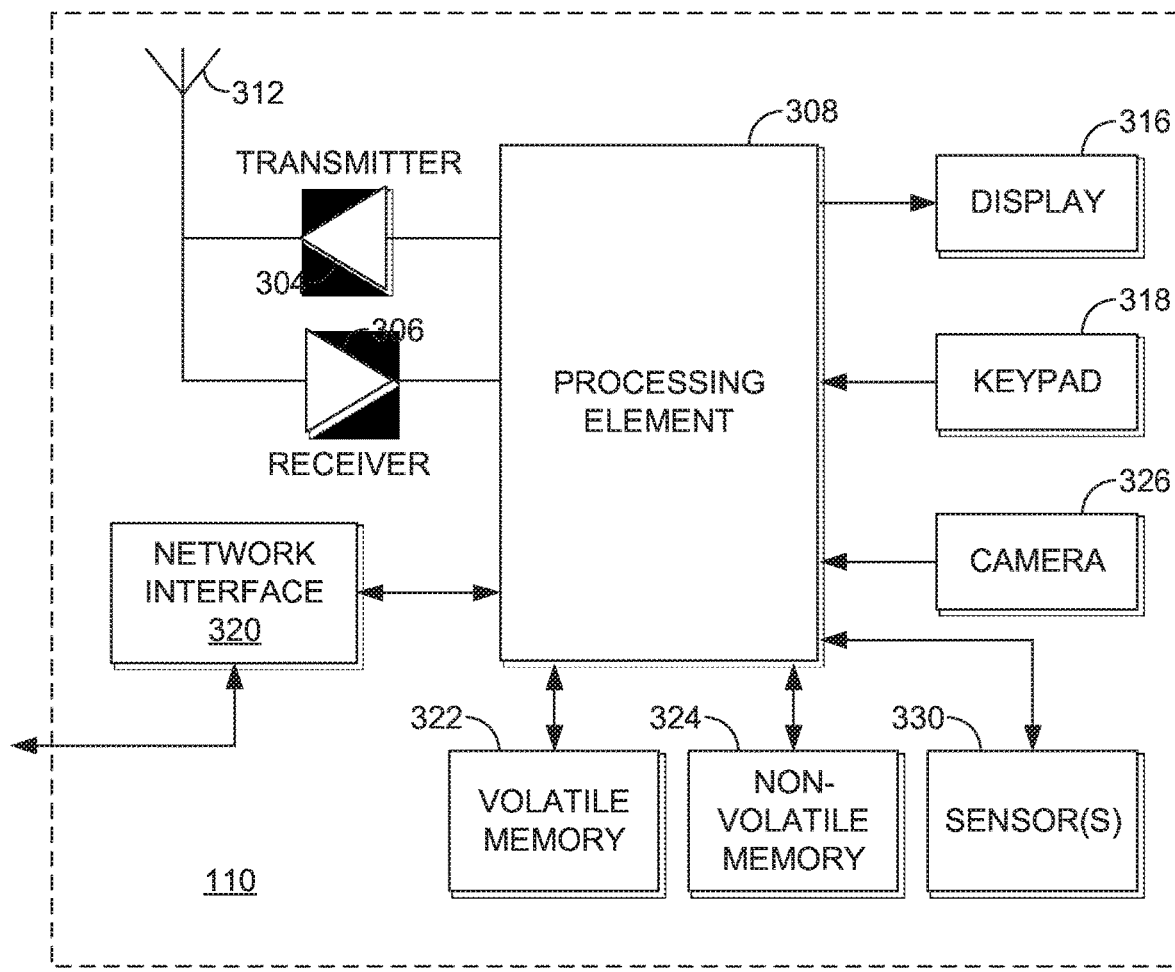

FIG. 3 is a schematic diagram of a computing entity in which aspects of the present disclosure are employed in, according to some embodiments.

Figure 4:
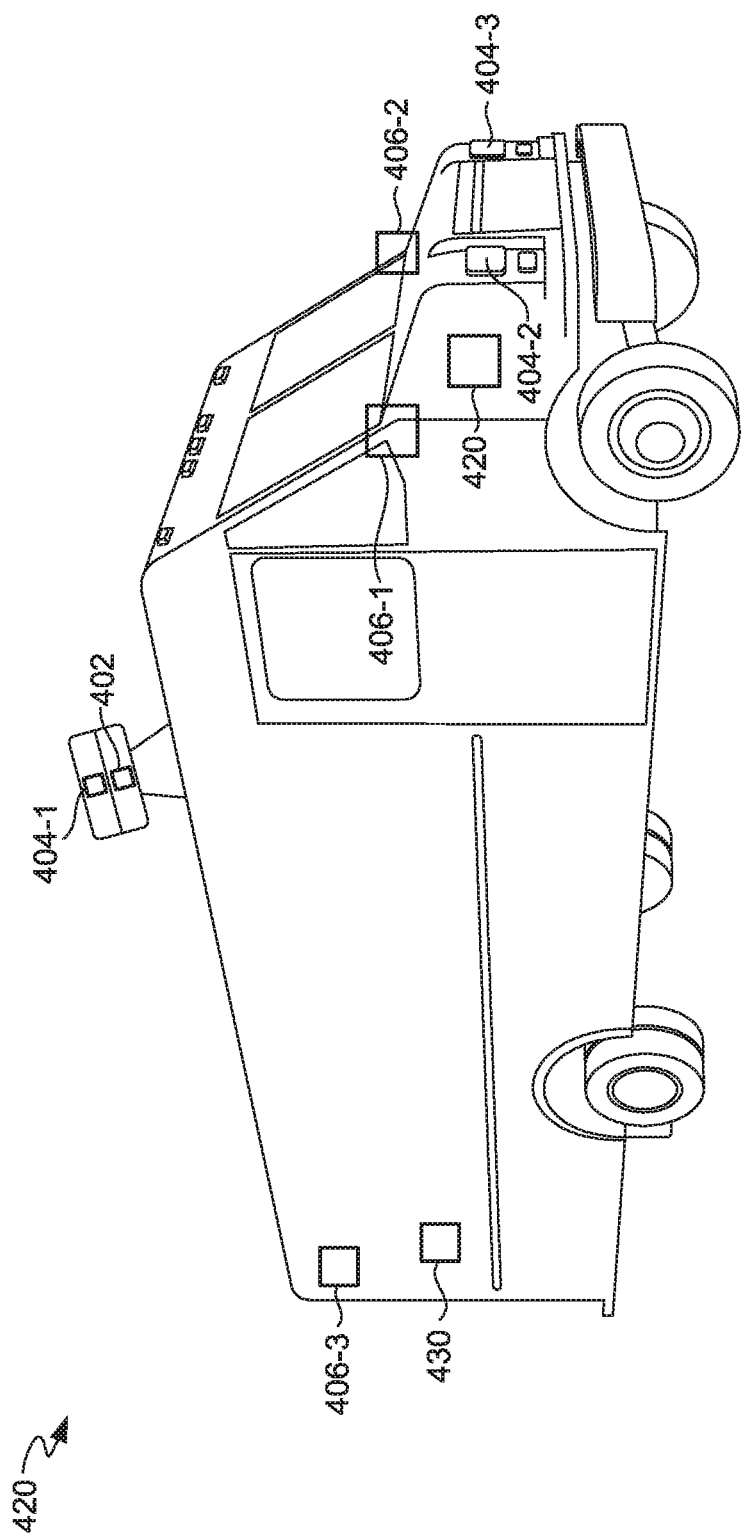

FIG. 4 is schematic diagram of a logistics vehicle, according to some embodiments.

Figure 5A:
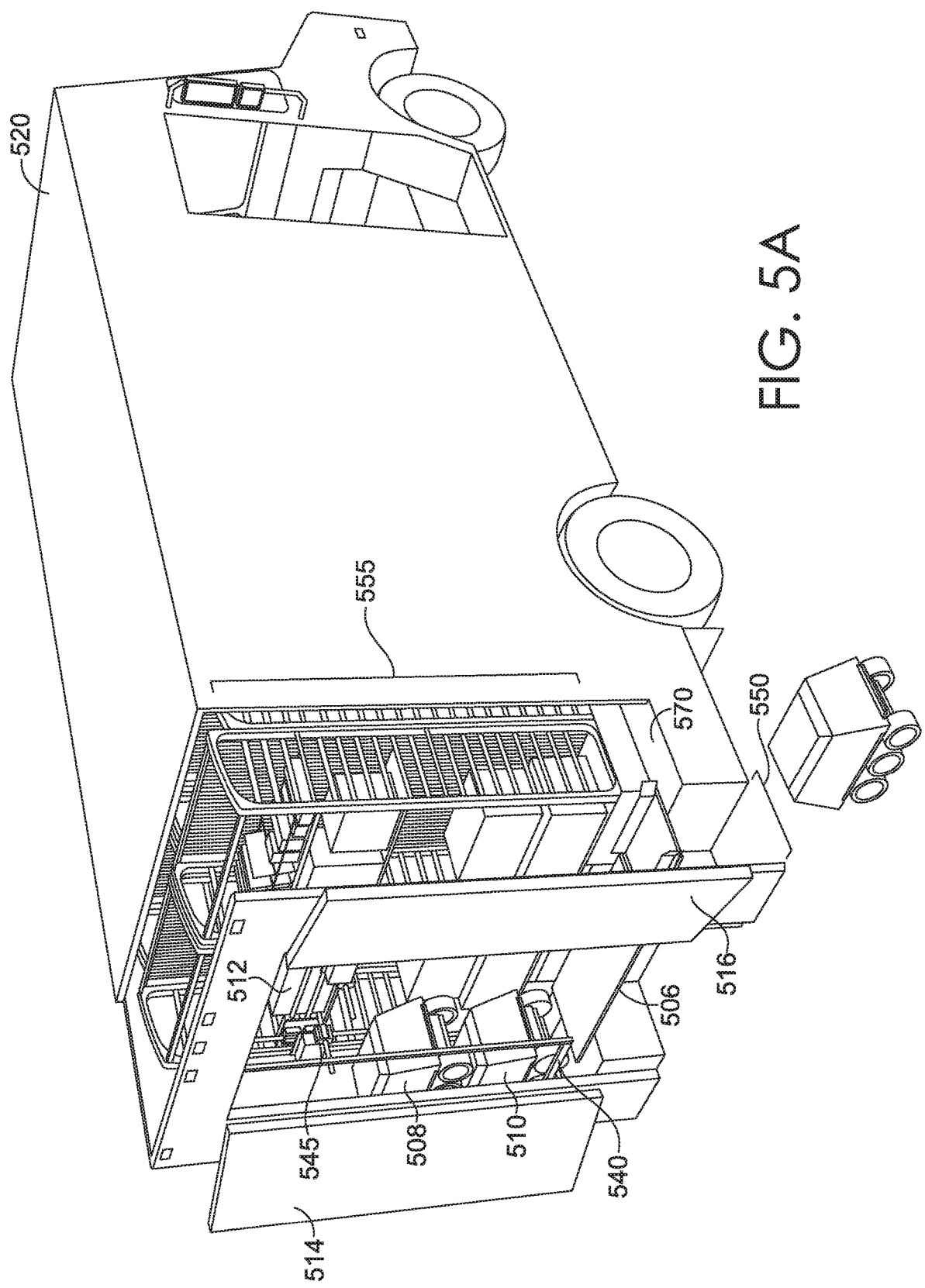

FIG. 5A is a schematic diagram of the inside of a logistics vehicle, according to some embodiments.

Figure 5B:
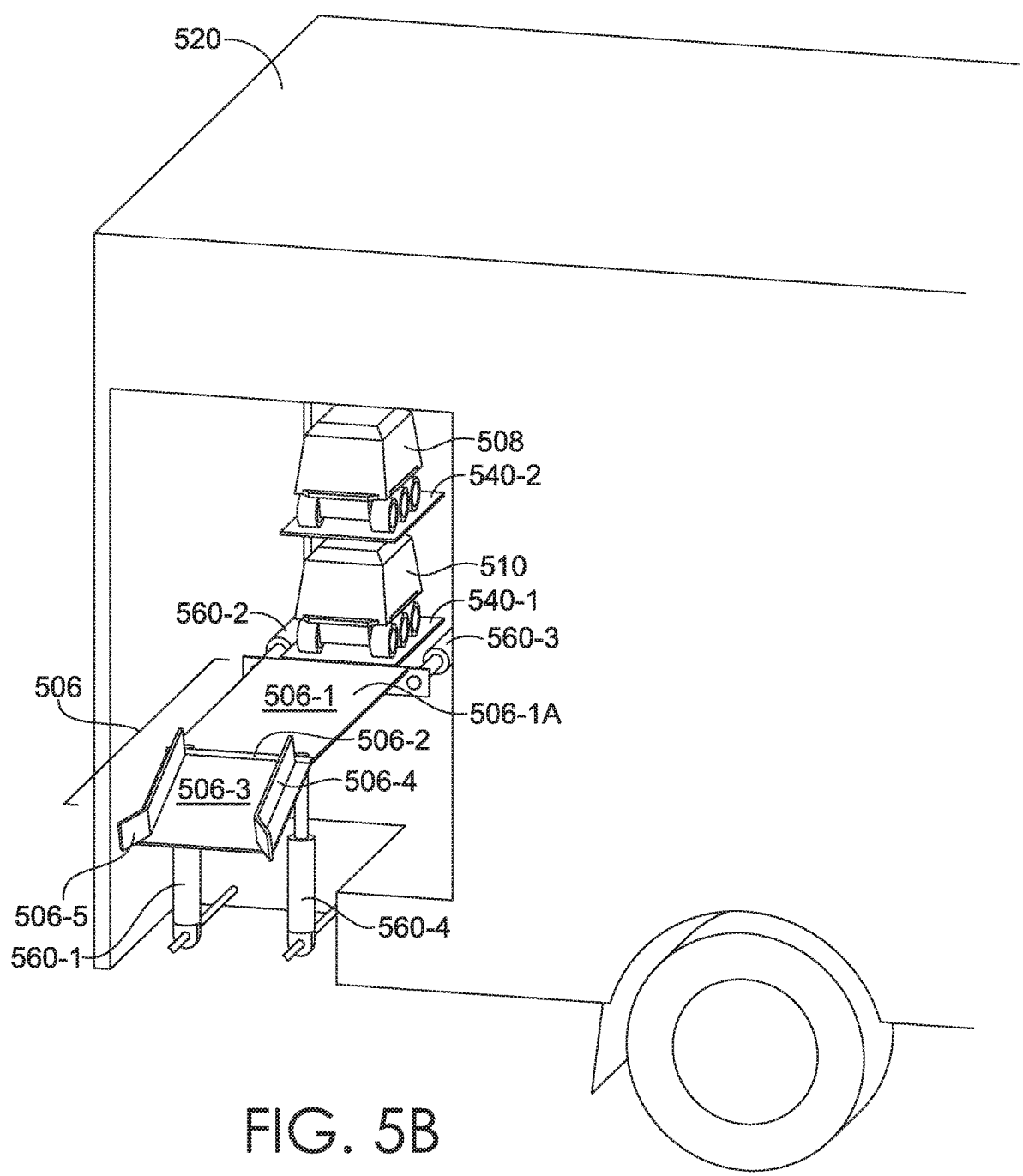

FIG. 5B is a side view of the rear portion of the logistics vehicle of FIG. 5A, according to some embodiments.

Figure 6:
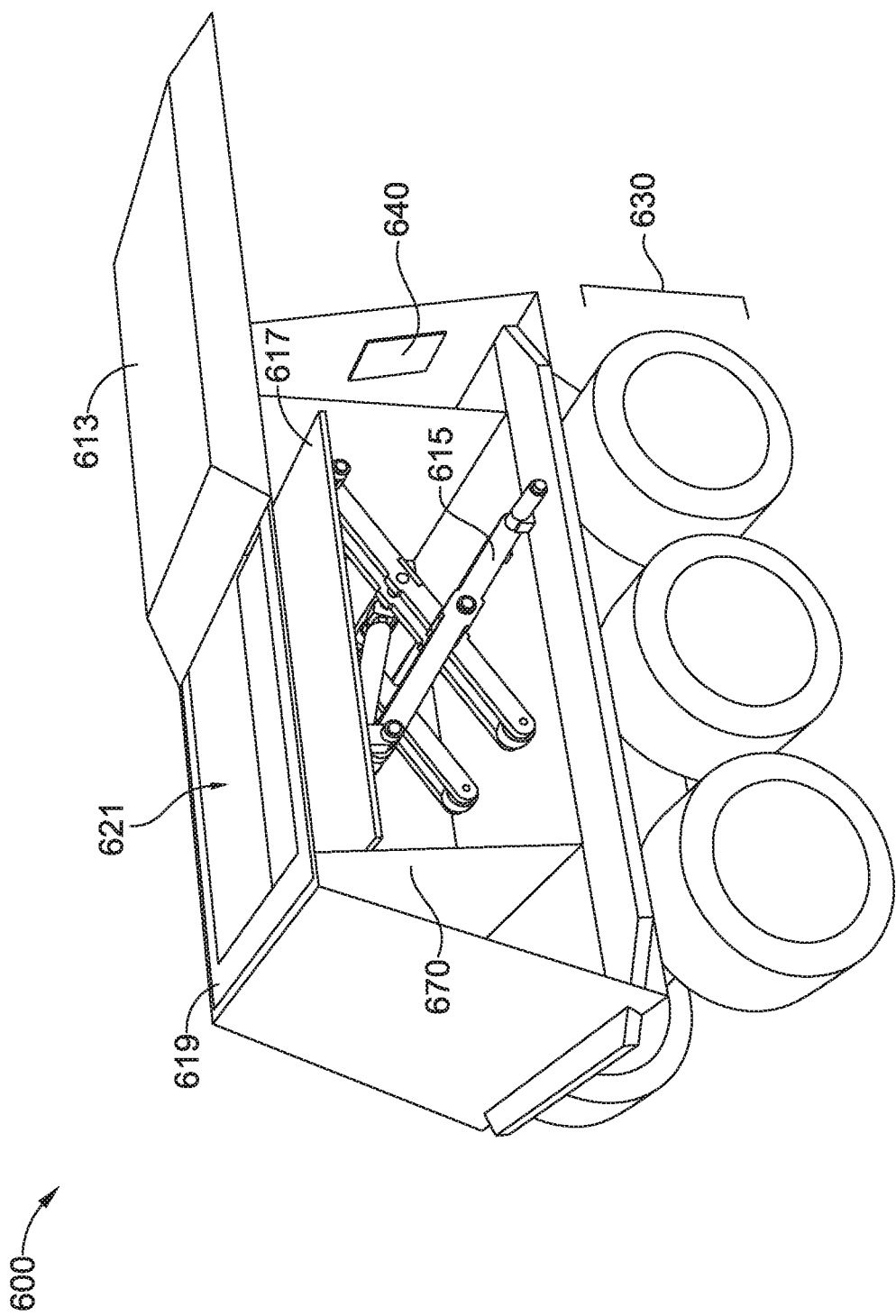

FIG. 6 is a schematic diagram of an example Unmanned Ground Vehicle (UGV) delivery bot, according to some embodiments.

Figure 7:
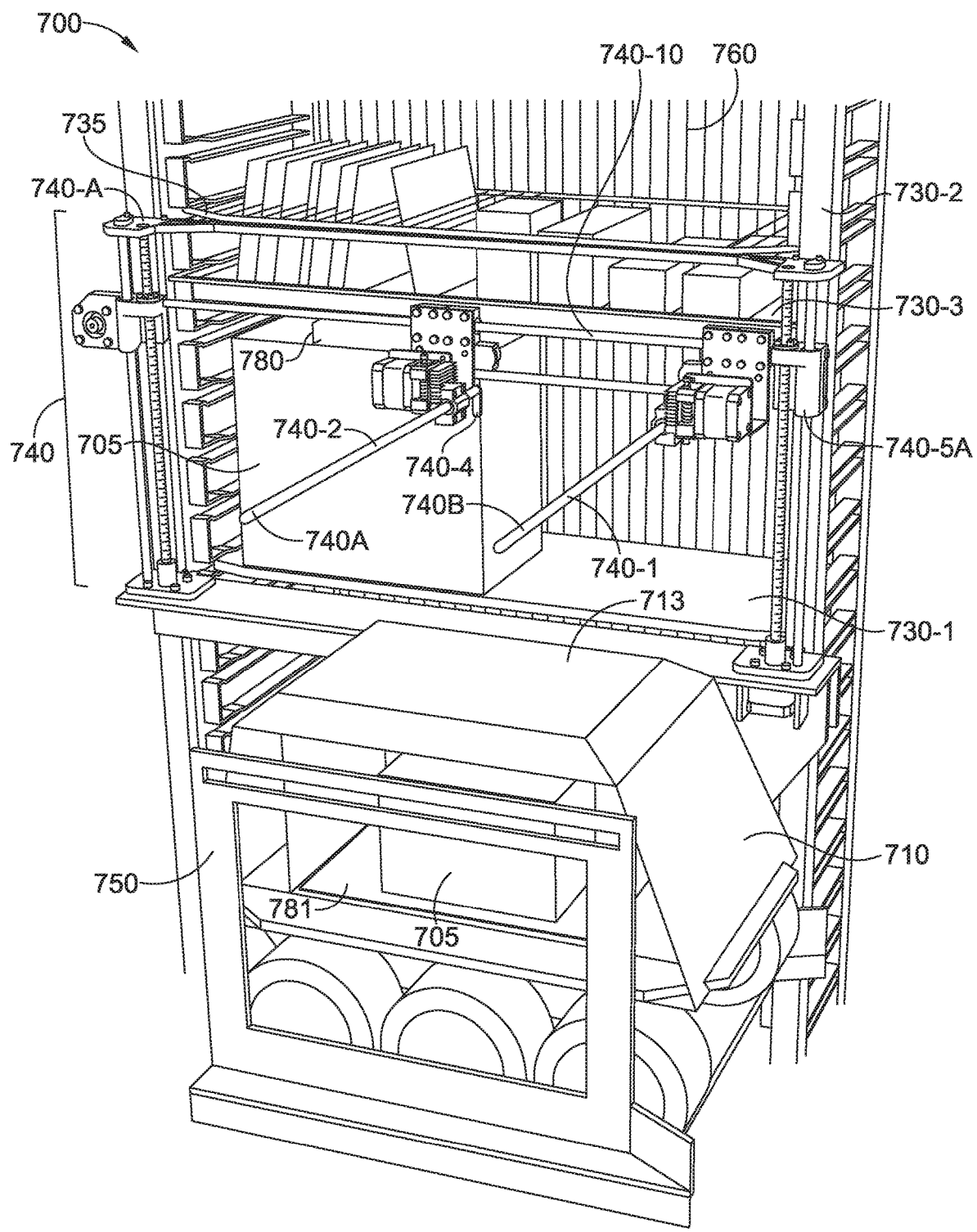

FIG. 7 is a front view of a system for loading one or more assets to or from a delivery bot via an apparatus, according to some embodiments.

Figure 8:
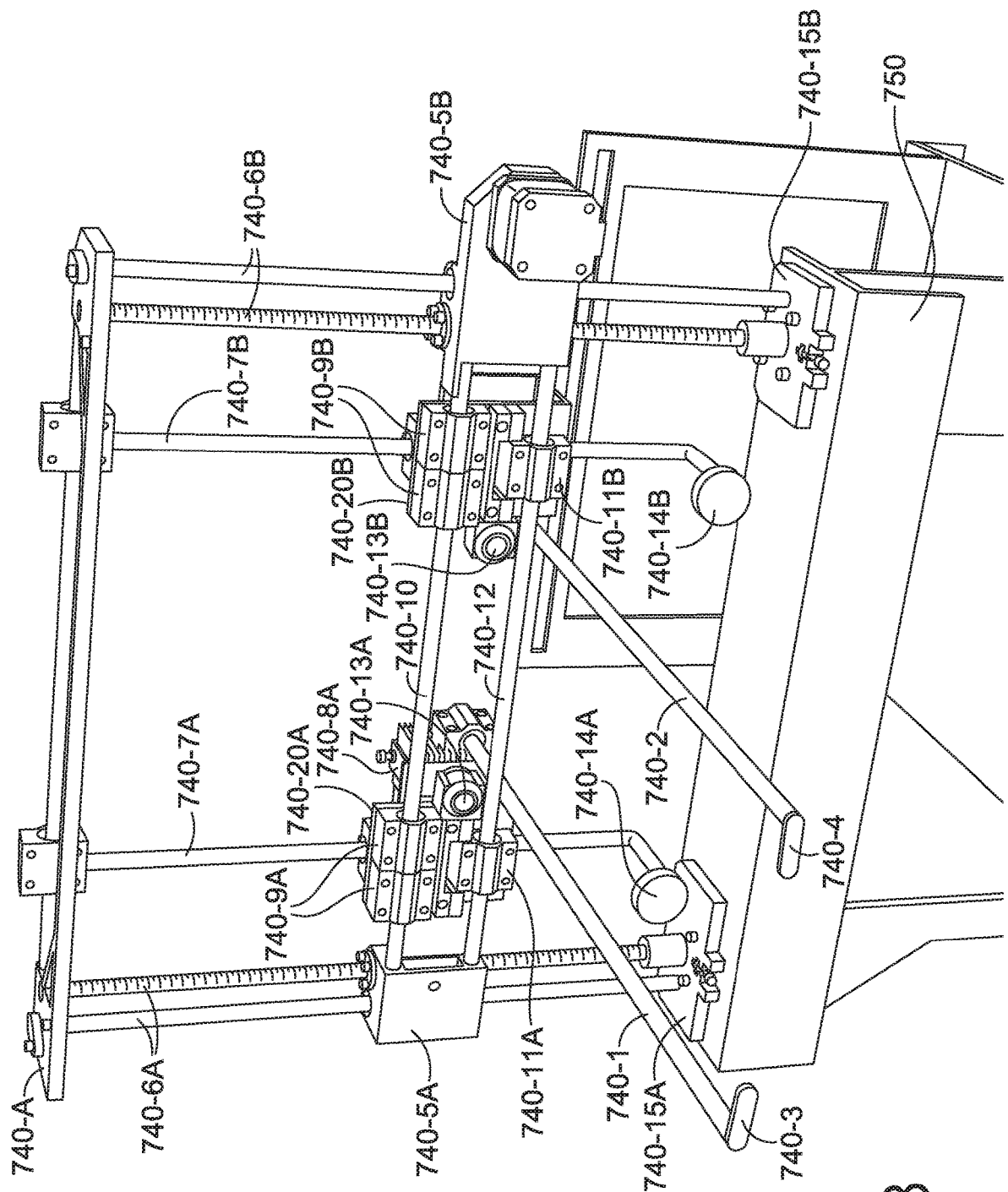

FIG. 8 is a rear view of the apparatus and the storage rack of FIG. 7, according to some embodiments.

Figure 9A:
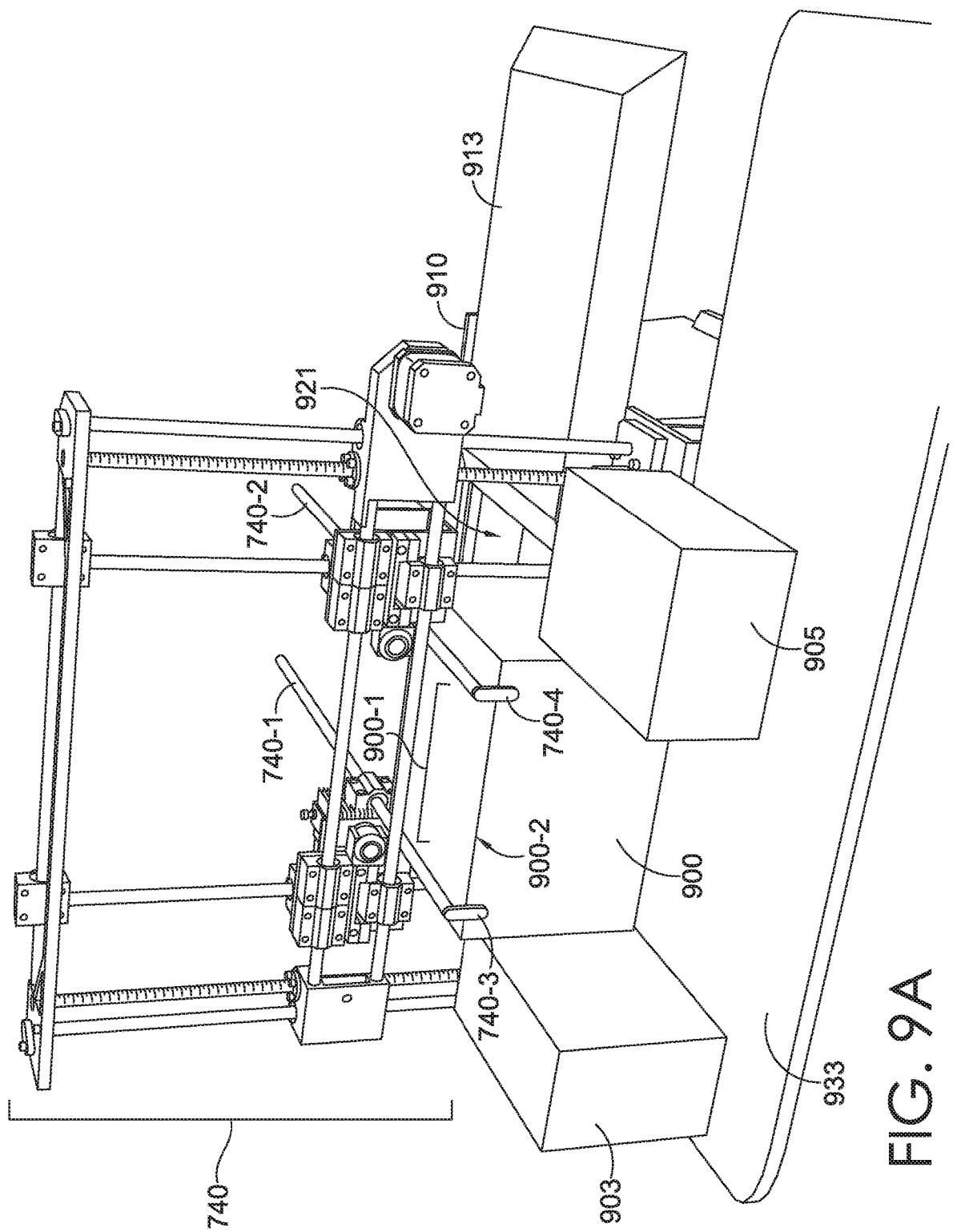

FIG. 9A illustrates a rear view of the apparatus of FIG. 8 and also illustrates how the apparatus selectively moves an asset from a storage unit to a delivery bot from a rear view, according to some embodiments.

Figure 9B:
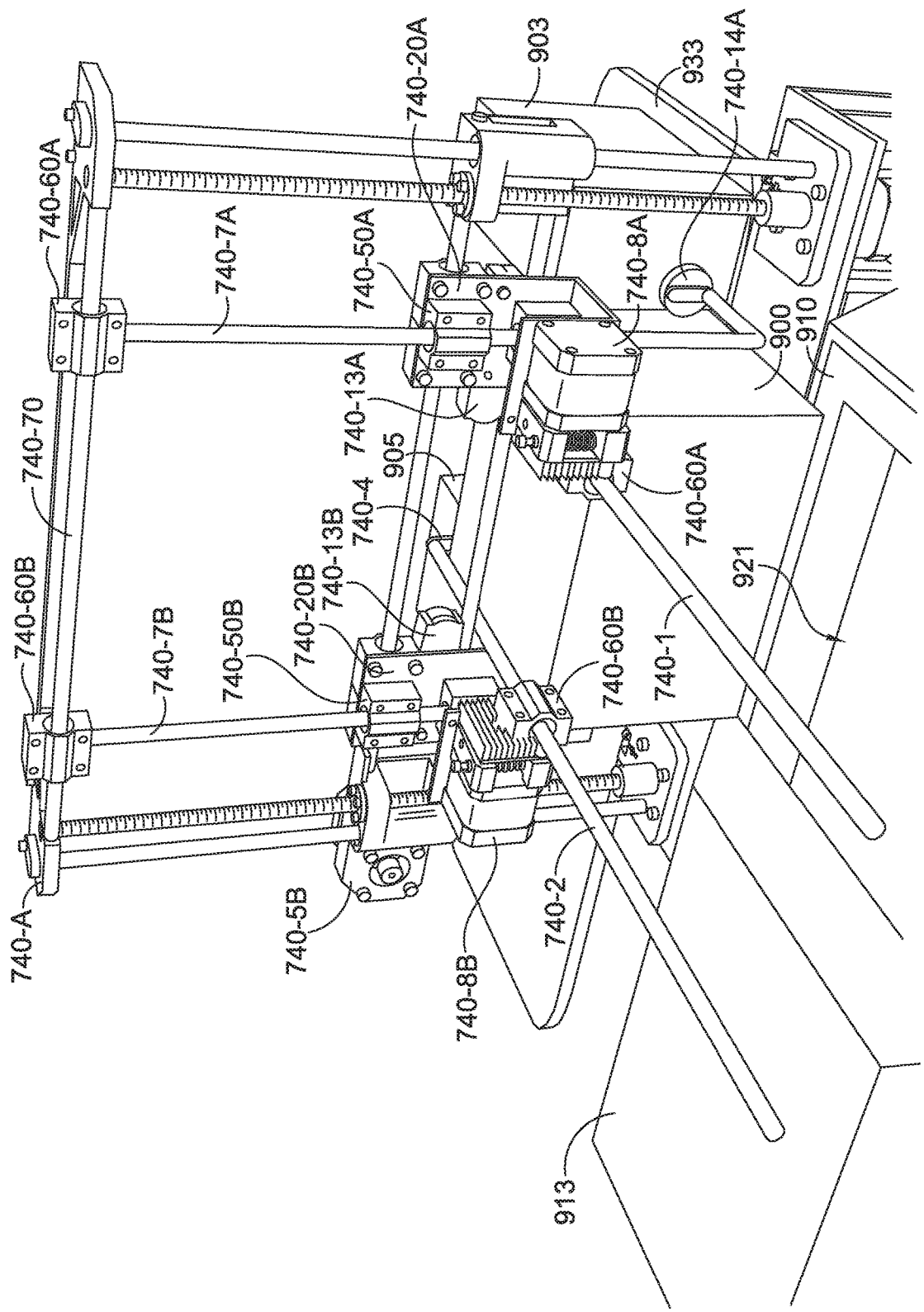

FIG. 9B illustrates a front view of the apparatus of FIG. 8 and FIG. 9A and also illustrates how the apparatus selectively moves an asset from the storage unit to the delivery bot from a front view, according to some embodiments.

Figure 10:
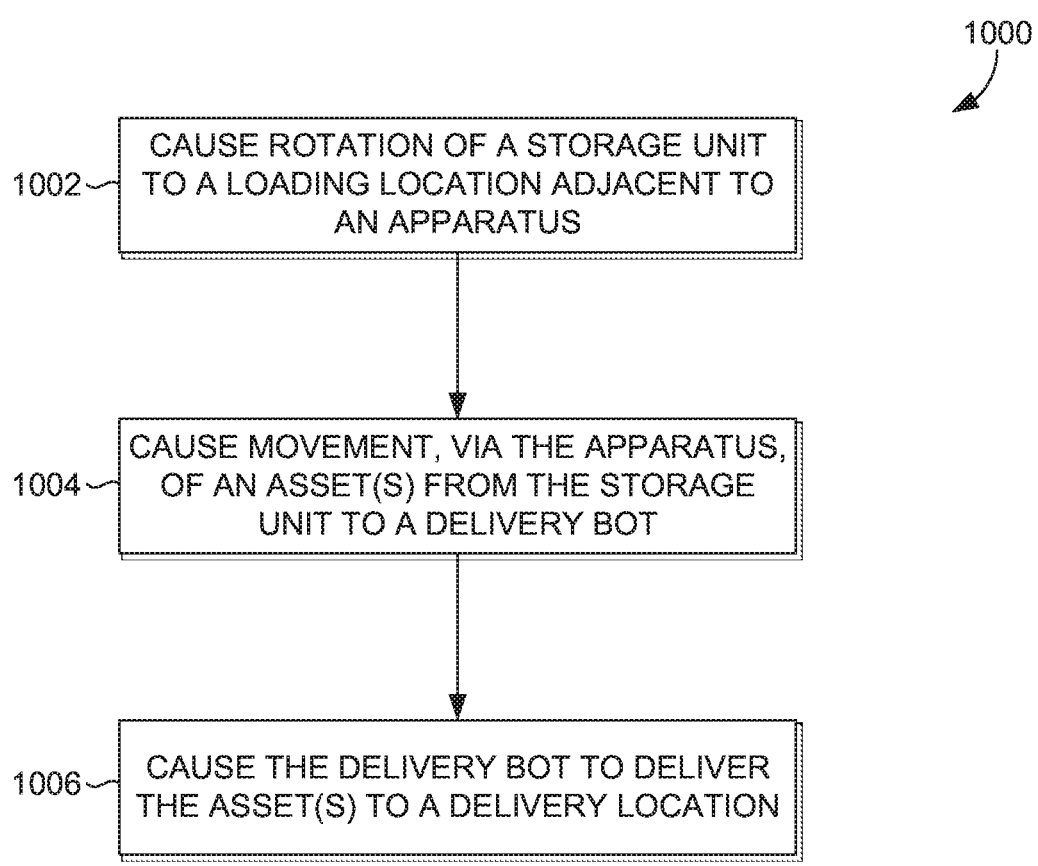

FIG. 10 is a flow diagram of an example process for causing a delivery bot to deliver one or more assets to a delivery location, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the

I. OVERVIEW

As described above, existing technologies are static and include limited functionality. For example, typical carrier vehicles and other vehicles may only contain static shelving carts that are configured to passively store assets. In an illustrative example, existing carrier vehicle technologies may include shelving carts that include a physical label that human operators read so that they can associate information on an asset with the label. This may require arduous labor by the human operator such as extensively orienting herself or otherwise moving in various locations within the vehicle to get to the correct shelving cart location for picking or storing a package. In this way, carrier personnel can manually load a package into a corresponding shelving cart by walking to the location within the carrier vehicle where the package is to be stored and placing the package into the shelving cart based on the matching label data on both the asset and the shelving cart. And after arriving at the delivery destination, the carrier personnel can unload the package by walking to the same location within the carrier vehicle where the package was loaded, pick the asset from the shelving cart, and then walk to a porch or other location to deliver the package to the consignee or recipient. However, there may be no other functional components that these carrier vehicles or shelving carts employ for asset delivery.

Some embodiments improve these vehicle technologies (and shelving cart technologies) by including new dynamic components and functionality that existing technologies do not now employ. For example, particular embodiments improve these technologies by employing one or more particular machines or manufactures for asset delivery within a logistics vehicle. For instance, some logistics vehicle embodiments include an apparatus to automatically load an asset, one or more delivery bots (e.g., an unmanned ground vehicle (UGV) to carry a package from the logistics vehicle to a delivery address), rotatable storage unit systems (as opposed to static shelving carts described above), and/or a launch component that is configured to allow the delivery bot to traverse outside of the logistics vehicle or inside of the logistics vehicle in order to complete one or more shipping operations (e.g., deliver a package to a delivery destination). This may allow for less error and faster execution time, among other things.

Some existing technologies also include static loading devices for loading assets such that they require extensive manual human operator intervention. For example, some loading devices are machines stored in warehouses or other facilities that include levers, pulleys, or other similar components that operators physically and manually leverage for the moving of large assets. Various embodiments of the present disclosure improve these loading devices and asset delivery systems in general by employing an apparatus (a particular machine or manufacture) that includes new and improved components and new and improved functionality that require little to no human operator intervention. For example, some apparatus embodiments are configured to be stored within a logistics vehicle and include an asset loading component that is configured to move (e.g., automatically) one or more assets from one or more storage units to a delivery bot so that the delivery bot can deliver the one or more assets outside of the logistics vehicle to a delivery location. In another example, the apparatus may alternatively or additionally include one or more sensors (e.g., a camera that employs object detection) that are configured to automatically guide the asset loading component to the one or more assets for the moving of the one or more assets from the one or more storage units to the delivery bot with no operator intervention.

Some existing technologies also include robots, drones, or other autonomous vehicles that are configured to move autonomously. However, none of these existing technologies include functionality or components that autonomously move assets to or from a logistics vehicle to a destination location. Various embodiments of the present disclosure improves these existing technologies because they include new functionality and components that autonomously move assets to or from a logistics vehicle to a destination location. For example, some delivery bot embodiments include sensors to sense when an asset has been loaded into the delivery bot and determine what specific location to drop off an asset.

In is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. APPARATUSES, METHODS, AND SYSTEMS

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example computing environment 100 in which aspects of the present disclosure are employed in, according to some embodiments. As shown in FIG. 1, this particular computing environment 100 includes one or more logistics vehicles 120, one or more logistics servers 105, one or more computing entities 110 (e.g., a mobile device, such as a DIAD or mobile phone), one or more satellites 112, one or more networks 135, one or more delivery bots 123, and one or more apparatuses 125 for loading one or more assets to or from the one or more delivery bots 123. Each of these components, entities, devices, systems, and similar words used herein interchangeably may be in direct or indirect communication with, for example, one another over the same or different wired and/or wireless networks. Additionally, while FIG. 1 illustrates the various system entities as separate, standalone entities, the various embodiments are not limited to this particular architecture. In some embodiments, the logistics vehicle 120 includes other components not illustrated that are communicatively coupled with the other components of the network(s) 135, such as storage units. In some embodiments, "communicatively coupled" means that two or more components can perform data transportation between each other via a wired (e.g., Ethernet or fiber-optic medium connected in a LAN) or wireless (e.g., IEEE 802.15.4) computer protocol network.

In various embodiments, the network(s) 135 represents or includes an IoT (internet of things) or IoE (internet of everything) network, which is a network of interconnected items (e.g., the delivery bot 123 and the apparatus 125) that are each provided with unique identifiers (e.g., UIDs) and computing logic so as to communicate or transfer data with each other or other components. Such communication can happen without requiring human-to-human or human-to-computer interaction. For example, an IoT network may include the logistics vehicle 120, which is equipped with one or more sensors and transmitter in order to process and/or transmit sensor data over the network 135 to the logistics server(s) 105, storage units (not shown), and/or the delivery bot(s) 123. In the context of an IoT network, a computer (not shown) within the logistics vehicle 120 (or any of the other components) can be or include one or more local processing devices (e.g., edge nodes) that are one or more computing devices configured to store and process, over the network(s) 135, either a subset or all of the received or respective sets of data to the one or more remote computing devices (e.g., the computing entities 110 and/or the logistics server(s) 105) for analysis.

In some embodiments, the local processing device(s) described above is a mesh or other network of microdata centers or edge nodes that process and store local data received from sensors coupled to the delivery bot(s) 123, the apparatus 125, and/or the logistics vehicle 120 and push or transmit some or all of the data to a cloud device or a corporate data center that is or is included in the one or more logistics server(s) 105. In some embodiments, the local processing device(s) store all of the data and only transmit selected (e.g., data that meets a threshold) or important data to the one or more logistics servers 105. Accordingly, the non-important data or the data that is in a group that does not meet a threshold is not transmitted. For example, the delivery bot(s) 123 may capture streaming, geographical mapping (e.g., via a lidar sensor), or video data and an indication that it has delivered an asset but only push a portion of the data, such as the indication that it has delivered the asset. Accordingly, only after the condition or threshold has been met, do the local processing device(s) transmit the data that meets or exceeds the threshold to remote computing devices such that the remote device(s) can take responsive actions, such as notify a user mobile device (e.g., computing entity 110) indicating the threshold has been met and/or cause a modification of data (e.g., consolidate entries of purchase orders). The data that does not meet or exceed the threshold is not transmitted in particular embodiments. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 135. Accordingly, in these embodiments, the one or more local processing devices can be associated with one or more gateway devices that translate proprietary communication protocols into other protocols, such as internet protocols.

In some embodiments, the computing environment 100 represents a network of components that work together to load assets into one or more delivery bots, which deliver the one or more assets to a delivery location. For example, the logistics vehicle 120 may have one or more sensors or telematics devices (described below) that detect when the logistics vehicle 120 has stopped. Responsively, the logistics vehicle 120 can send a control to one or more storage units (not shown) to rotate or shift a storage unit to a loading location (e.g., a location at the back of the logistics vehicle 120 where the apparatus 125 and delivery bot(s) 123 is located). The storage unit may have one or more assets stored thereon, which are ready to be loaded into a delivery bot. In response to the apparatus 125 detecting (e.g., via a camera with object detection capabilities) an asset at the loading location, the apparatus 125 may load the asset into the delivery bot 123. The delivery bot 123 may include one or more sensors (e.g., a pressure sensor) to detect that it has been loaded and/or otherwise receive communication from the logistics server(s) 105 or other component to carry the loaded asset(s) to the delivery location, such as at a doorstep of a particular dwelling unit. In some embodiments, one or more sensors on the logistics vehicle 120 guide the delivery bot 123 to the particular delivery location. Alternatively or additionally, the logistics server(s) 105 can transmit geolocation coordinate targets or other information to the delivery bot(s) 123 to guide the delivery bots(s) 123 to the correct delivery location. Alternatively or additionally, the delivery bot(s) 123 themselves may be equipped with their own sensors (e.g., range finders, lidar, radar, etc.) to help guide them to the correct delivery location.

1. Exemplary Analysis Computing Entities

FIG. 2 provides a schematic of a logistics server(s) 105 according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, cloud computing nodes, virtual machines, virtual containers, the like, and/or any combination of devices or entities adapted to perform the functions, operations, and/or processes described herein. Such functions, operations, and/ or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the logistics server(s) 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the logistics server(s) 105 may include or be in communication with one or more processing elements 205 (also referred to as processors, processing circuitry, and/or similar terms used herein interchangeably) that communicate with other elements within the logistics server(s) 105 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the logistics server(s) 105 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the logistics server(s) 105 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the logistics server(s) 105 with the assistance of the processing element 205 and operating system.

As indicated, in particular embodiments, the logistics server(s) 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the logistics server(s) 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the logistics server(s) 105 may include or be in communication with one or more input elements, such as a keyboard input, a mouse input, a touch screen/display input, motion input, movement input, audio input, pointing device input, joystick input, keypad input, and/or the like. The logistics server(s) 105 may also include or be in communication with one or more output elements (not shown), such as audio output, video output, screen/display output, motion output, movement output, and/or the like.

As will be appreciated, one or more of the logistics server(s)'s 105 components may be located remotely from other logistics server(s) 105 components, such as in a distributed system (e.g., a cloud computing system). Additionally or alternatively, the logistics server(s) 105 may be represented among a plurality of logistics servers. For example, the logistics server(s) 105 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 135. Furthermore, one or more of the components may be combined and additional components performing functions described herein may be included in the logistics server(s) 105. Thus, the logistics server(s) 105 can be adapted to accommodate a variety of needs and circumstances. As will be recognized, these architectures and descriptions are provided for exemplary purposes only and are not limiting to the various embodiments.

2. Exemplary Computing Entities

Computing entities 110 may be configured for functionality described herein with respect to one or more: delivery bots, logistics vehicles, apparatuses, and/or operation by a user (e.g., a vehicle operator, delivery personnel, customer, and/or the like). In some embodiments, a computing entity 110 is embedded within or otherwise coupled to the logistics vehicle(s) 120, the delivery bot(s) 123, and/or the apparatus(s) 125 so that these components may perform their suitable functionality as described herein. In certain embodiments, computing entities 110 may be embodied as handheld computing entities, such as mobile phones, tablets, personal digital assistants, and/or the like, that may be operated at least in part based on user input received from a user via an input mechanism. Moreover, computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, computing entities 110 may be utilized as onboard controllers for UAVs configured for picking-up and/or delivering packages to various locations, and accordingly such computing entities 110 may be configured to monitor various inputs (e.g., from various sensors) and generated various outputs. It should be understood that various embodiments of the present disclosure may comprise a plurality of computing entities 110 embodied in one or more forms (e.g., parcel security devices kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like-whether or not associated with a carrier. In particular embodiments, a user may operate a computing entity 110 that may include one or more components that are functionally similar to those of the logistics server(s) 105. FIG. 3 provides an illustrative schematic representative of a computing entity 110 that can be used in conjunction with embodiments of the present disclosure. In general, the terms device, system, computing entity, entity, and/or similar words used herein interchangeably may refer to, for example, one or more: computers, computing entities, desktops, mobile phones, micro-computers (e.g., RASBERY PI), tablets, phablets, notebooks, laptops, distributed systems, vehicle multimedia systems, autonomous vehicle onboard control systems, watches, glasses, key fobs, radio frequency identification (RFID) tags/readers, ear pieces, scanners, imaging devices/cameras (e.g., part of a multiview image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 110 can be operated by various parties, including carrier personnel (sorters, loaders, delivery drivers, network administrators, and/or the like). As shown in FIG. 3, the computing entity 110 can include an antenna 312, a transmitter 304 (e.g., radio), a receiver 306 (e.g., radio), and a processing element 308 (e.g., CPLDs, microprocessors, multi-core processors, coproces sing entities, ASIPs, microcontrollers, and/or controllers) that provides signals to and receives signals from the transmitter 304 and receiver 306, respectively. In some embodiments, the computing entity 110 includes one or more sensors 330 (e.g., a camera with object detection capabilities). In some embodiments, at least one of the computing entities 110 is coupled to the logistics vehicle 120. The one or more sensors 330 can be one or more of: a pressure sensor, an accelerometer, a gyroscope, a geolocation sensor (e.g., GPS sensor), a radar, a lidar, sonar, ultrasound, an object recognition camera, and any other suitable sensor used to detect objects or obtain information in a geographical environment that the logistics vehicle 120 is within.

The signals provided to and received from the transmitter 304 and the receiver 306, respectively, may include signaling information in accordance with air interface standards of applicable wireless systems. In this regard, the computing entity 110 may be capable of operating with one or more air interface standards, communication protocols, modulation types, and access types. More particularly, the computing entity 110 may operate in accordance with any of a number of wireless communication standards and protocols, such as those described above with regard to the logistics server(s) 105. In a particular embodiment, the computing entity 110 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 110 may operate in accordance with multiple wired communication standards and protocols, such as those described above with regard to the logistics server(s) 105 via a network interface 320.

Via these communication standards and protocols, the computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 110 can also download changes, add-ons, and updates, for instance, to its firmware, software (e.g., including executable instructions, applications, program modules), and operating system.

According to particular embodiments, the computing entity 110 may include location determining aspects, devices, modules, functionalities, and/or similar words used herein interchangeably. For example, the computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the computing entity 110 to interact with and/or cause display of information from the logistics server(s) 105, as described herein. The user input interface can comprise any of a number of devices or interfaces allowing the computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9)

and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the computing entity 110 may also include an camera, imaging device, and/or similar words used herein interchangeably 326 (e.g., still-image camera, video camera, IoT enabled camera, IoT module with a low resolution camera, a wireless enabled MCU, and/or the like) configured to capture images. The computing entity 110 may be configured to capture images via the onboard camera 326, and to store those imaging devices/cameras locally, such as in the volatile memory 322 and/or non-volatile memory 324. As discussed herein, the computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata (e.g., data that describes other data, such as describing a payload) associated with the image data that may be accessible to various computing entities 110.

The computing entity 110 may include other input mechanisms, such as scanners (e.g., barcode scanners), microphones, accelerometers, RFID readers (or Near-Field Communication (NFC) readers), and/or the like configured to capture and store various information types for the computing entity 110. For example, a scanner may be used to capture parcel/item/shipment information/data from an item indicator disposed on a surface of a shipment or other item. In certain embodiments, the computing entity 110 may be configured to associate any captured input information/data, for example, via the onboard processing element 308. For example, scan data captured via a scanner may be associated with image data captured via the camera 326 such that the scan data is provided as contextual data associated with the image data.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the logistics server(s) 105 and/or various other computing entities.

In another embodiment, the computing entity 110 may include one or more components or functionality that are the same or similar to those of the logistics server(s) 105, as described in greater detail above. As will be recognized, these architectures and descriptions are provided for exemplary purposes only and are not limiting to the various embodiments.

FIG. 4 is schematic diagram of a logistics vehicle 420, according to some embodiments. In some embodiments, the logistics vehicle 420 represents the logistics vehicle 120 of FIG. 1 and vice versa. Although the logistics vehicle 420 is represented as a specific vehicle with specific sensors, it is understood that any suitable vehicle and/or sensor may exist. For example, in some embodiments, the logistics vehicle 420 is represented as a drone that travels in air space to unload parcels, an aircraft, a car, a boat, etc. In some embodiments, the logistics vehicle 420 represents is an autonomous vehicle ("AV") (e.g., a "self-driving car") that is either fully or partially autonomous. A fully autonomous vehicle can operate without human control and does not require human intervention (e.g., the vehicle does not require a human driver). A "partial" autonomous vehicle operates some functions (e.g., alerts and emergency braking) autonomously without human intervention but requires at least some human intervention (e.g., pressing gas pedal, turn on blinkers, etc.). These autonomous vehicles can sense their local environment, classify different kinds of objects that they detect, and interpret sensory information to identify appropriate navigation paths all while conforming to transportation rules.

In various embodiments, the logistics vehicle 420 includes the lidar units 404-1, 404-2, 404-3, the radar units 406-1 406-2, 406-3, the telematics device 420, the camera(s) 402, and the computing device 430 (e.g., a computing entity 110), such as an edge node. The lidar (Light Detection and Ranging) units 404 are sensors that detect objects and build a map of a geographical environment based on transmitting a plurality of light pulses a second and measure how long it takes for those light pulses to bounce off of objects in the environment back to the sensor (e.g., 150,000 pulses per second). These lidar units, such as 404-1, can indefinitely spin transversely in a plane parallel to the ground capturing a 360-degree image of the logistics vehicle 120's surroundings. The output is a three-dimensional mapping of the geographical environment. These sensors can also calculate the distance between itself and the objects within the environment, as well as detecting exact sizes, colors, shapes of objects, and/or other metadata.

The radar units 406 are similar to the lidar units 404 in that they also transmit signals and measure how long these signals take to bounce off objects back to the sensor. However, these signals are radio waves, instead of light pulses (which are faster). These sensors detect road dynamics, such as detours, traffic delays, vehicle collisions, and other objects. Long range radar typically detects objects further away compared to lidar, which can be used for adaptive cruise control and the like. Whereas lidar typically detects objects that are less far away and is used for emergency braking, pedestrian detection, collision avoidance, etc.

The one or more cameras 402 utilize object detection or computer vision algorithms to detect and classify objects on the road, such as lane lines and traffic signs. These cameras can provide images to the computing device 430 for determining depth of field, peripheral movement, and dimensionality of objects. In some embodiments, these cameras 402 use deep learning or other machine learning models and techniques for object classification. For example, in some embodiments, convolutional neural networks (CNN) are used to detect and classify objects, such as determining and classifying objects (e.g., car, person, traffic light, etc.) enclosed in a bounding box. The one or more cameras 402 can be used for short-distance recognition, such park assistance, compared to other sensors, such as lidar.

The telematics device 420 is configured to control a variety of vehicle sensors, collect vehicle telematics data generated by sensors, and transmit the telematics data to the one or more analysis computing entities 105 and/or the computing entities 110 via one of several communication methods. In various embodiments, the logistics vehicle 120 is equipped with one or more vehicle sensors (e.g., the vehicle's engine speed sensor, speed sensor, seat belt status sensor, direction sensor, and location sensor). These sensors can detect one or more of the following attributes: engine ignition (e.g., on or off), engine speed (e.g., RPM and idle time events), vehicle speed (e.g., miles per hour), seat belt status (e.g., engaged or disengaged), vehicle heading (e.g., degrees from center), vehicle backing (e.g., moving in reverse or not moving in reverse), vehicle doors (e.g., open or closed), vehicle handles (e.g., grasped or not grasped by a driver), vehicle location (e.g., latitude and longitude), distance traveled (e.g., miles between two points), use of portable data acquisition device (e.g., in use or not in use), throttle position, brake pedal position, parking brake position, and other measurements (e.g., engine oil pressure, engine temperature, or engine faults). These sensors described above may be configured, for example, to operate in any fashion suitable to generate computer-readable data that may be captured and transmitted by the telematics device 420.

In some embodiments, the telematics device 420 includes one or more of the following components, which are not shown: a processor, a location-determining device or sensor (e.g., GPS sensor), a real-time clock, J-Bus protocol architecture, an electronic control module (ECM), a port for receiving data from the vehicle sensors in one of the logistics vehicles 120, a communication port for receiving instruction data, a radio frequency identification (RFID) tag, a power source, a data radio for communication with a WWAN, a WLAN and/or a WPAN, FLASH, DRAM, and NVRAM memory modules, and a programmable logic controller (PLC). In an alternative embodiment, the RFID tag, the location sensor, and the PLC may be located in the logistics vehicle 120 external to the telematics device 420. In various embodiments, the telematics device may omit certain of the components described above. It should be understood that the telematics device may include any other suitable components. For example, the telematics device may include other types of communications components than those described above.

According to one embodiment, a processor is configured to capture and store telematics data from one or more vehicle sensors (e.g., GPS sensor, lidar unit 404, radar unit 406-1, etc.) on a logistics vehicle 120 upon the occurrence of one or more defined vehicle events. The processor is configured such that any parameter measurable by the one or more vehicle sensors may be defined as a vehicle event. The processor is also configured to associate telematics data received from the vehicle sensors 410 with contextual data indicating, for example: (1) the time the data was captured (e.g., through time-stamping), (2) the vehicle the data was captured from, (3) the driver of the vehicle, (4) a log reason for capturing the data, and/or (5) the route the driver was on at the time the data was collected. In various embodiments, the processor is further configured to transmit the telematics data to the computing entity 110 and/or the one or more analysis computing entities 105. In other embodiments, the processes described herein as being carried out by a single processor may be accomplished by multiple processors.

In one embodiment, the location sensor, which may be one of several components available in the telematics device 420, may be compatible with a low Earth orbit (LEO) satellite system or a Department of Defense (DOD) satellite system (e.g., via the satellite 112). Alternatively, triangulation may be used in connection with various cellular towers positioned at various locations throughout a geographic area in order to determine the location of the logistics vehicle 120 and/or its driver. The location sensor 202 may be used to receive position, time, and speed data. It will be appreciated by those skilled in the art that more than one location sensor 202 may be utilized, and that other similar techniques may likewise be used to collect geo-location information associated with the logistics vehicle 120 and/or its driver.

In some embodiments, the ECM with J-Bus protocol may be one of several components available in the telematics device 420. The ECM, which may be a scalable and subservient device to the telematics device 420, may have data processor capability to decode and store analog and digital inputs and ECM data streams from vehicle systems and the sensors. The ECM may further have data processing capability to collect and present vehicle data to the J-Bus (which may allow transmittal to the telematics device 420), and output standard vehicle diagnostic codes when received from a vehicle's J-Bus-compatible on-board controllers or vehicle sensors.

In some embodiments, an instruction data receiving port may be one of several components available in the telematics device 420. Embodiments of the instruction data receiving port may include an Infrared Data Association (IrDA) communication port, a data radio, and/or a serial port. The instruction receiving data port may receive instructions for the telematics device 420. These instructions may be specific to the logistics vehicle 120 in which the telematics device 420 is installed, specific to the geographical area in which the logistics vehicle 120 will be traveling, or specific to the function the logistics vehicle 120 serves within the fleet.

In some embodiments, a radio frequency identification (RFID) tag may be one of several components available for use with the telematics device 420. One embodiment of the RFID tag may include an active RFID tag, which comprises at least one of the following: (1) an internal clock; (2) a memory; (3) a microprocessor; and (4) at least one input interface for connecting with sensors located in the logistics vehicle 120 or the telematics device 420. Another embodiment of the RFID tag may be a passive RFID tag. One or more RFID tags may be internal to the telematics device 420, wired to the telematics device 420, and/or proximate to the telematics device 420. Each RFID tag may communicate wirelessly with RFID interrogators within a certain geographical range of each other. RFID interrogators may be located external to the logistics vehicle 120 and/or within the computing entity 110 that can be carried in and out of the logistics vehicle 120 by the vehicle operator.

In some embodiments, vehicle performance and tracking data collected by the telematics device 420 (e.g., telematics data) may be transmitted via a WPAN to, and stored by, the computing entity 110 until a communication link can be established between the computing entity 110 and the analysis computing entity 105, or similar network entity or mainframe computer system. In one embodiment, the computing entity 110 may display telematics data for the driver's viewing, which may be helpful in troubleshooting vehicle performance problems and showing delivery route progress and instructions. In an alternative embodiment, the computing entity 110 may be a hand-held data acquisition device, like an iPAQ. The Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and portable data acquisition devices equipped with Bluetooth™ devices.

In some embodiments, the telematics device 420 receives the sensor data from the mapping sensors, such as the lidar units 404, radar sensors 406, and camera 402 in order to help with functionality described herein for loading one or more assets into a delivery bot or storage unit. For example, the logistics vehicle 420's telematics device 420 may detect when the logistics vehicle 420 has stopped (e.g., via an engine sensor). Responsively, the logistics vehicle 120 (or logistics serer(s) 105) can send a control to one or more storage units (not shown) to rotate or shift a storage unit to a loading location. The storage unit may have one or more assets stored thereon, which are ready to be loaded into a delivery bot. In response to the logistic vehicle 420 (or an apparatus) detecting (e.g., via a camera with object detection capabilities) an asset at the loading location, the apparatus within the logistics vehicle 420 may load the asset into a delivery bot (e.g., the delivery bot 123). In some embodiments, one or more sensors illustrated in FIG. 4 may be used to detect that the asset has been loaded into the delivery bot so that the delivery bot carries the loaded asset(s) to the delivery location, such as at a doorstep of a particular dwelling unit.

A "logistics vehicle" as described herein is any suitable vehicle (e.g., an airplane, freight ship, carrier van, drone, UMV or autonomous car, etc.) that performs or is associated with any suitable logistics or shipping operation. A "shipping operation" as described herein is any suitable operation related to shipping, such as a final mile delivery of assets (i.e., delivering assets to final destination location), delivering assets from one sorting facility to another, delivering assets from a carrier store to a sorting facility, importing or exporting assets, flying or otherwise carrying assets to/away from a sorting facility, loading an asset into a logistics vehicle, picking an asset from a logistics vehicle for drop off at another location, etc. An "asset" as described herein is any tangible item that is transported from one location to another. Assets may be or include the contents that enclose product or other items people wish to ship. For example, an asset may be or include a parcel or group of parcels, a package or group of packages, a box, a crate, a drum, a container, a box strapped to a pallet, a bag of small items, and/or the like.

A "loading location" as described herein is any suitable location for loading one or more assets onto a respective storage unit or respective delivery bot. The loading location may be at or close to an area where an operator or other loading mechanisms (e.g., a robotic arm component) performs the loading operations. For example, the loading location may be at the rear of the logistics vehicle 420, on the side of the logistics vehicle 420, and/or on the rear wall inside of a cab of the logistics vehicle 420 such that a driver can load parcels just before engaging in driving, for example. Logistics vehicles may be configured to house or receive storage units for the storage of assets. A "storage unit" as described herein is any tangible area or enclosure that is configured to store or receive one or more assets. For example, a storage unit can be or include: one or more shelf slots, one or more containers, a locker bank, a cage, one or more cubbies, one or more drawers, and/or any other partial or full enclosure that receives assets. A "delivery bot" as described herein is any machine or apparatus that can at least partially autonomously receive or store one or more assets and traverse to a specific location and drop off or unload the received or stored asset at or near the specific location. For example, a delivery bot can be or include one or more: robots, drones, unpiloted aircraft or Unmanned Arial Vehicles (UAV), UGVs, remote control vehicles, or the like that are configured to store or receive one or more assets, traverse (via air space or on a ground surface) to a particular geographical location, and drop off the one or more assets at the particular geographical location (e.g., geo-coordinates).

FIG. 5A is a schematic diagram of the inside of a logistics vehicle 520, according to some embodiments. In some embodiments, the logistics vehicle 520 represents or includes the components described with respect to the logistics vehicle 420 of FIG. 4. Accordingly, the logistics vehicle 520 may include the sensors and telematics device described with respect to FIG. 4. The logistics vehicle 520 includes the asset storage units 555, the delivery bot storage racks 540, the aperture 550 that defines an opening at the bottom portion 570 of the logistics vehicle 520, the delivery bots 508 and 510, the asset 512 (among other assets), the doors 514 and 516, the platform 506 (also described herein as a "launch component"), and an apparatus 545.

FIG. 5A generally illustrates how the asset 512 can be loaded to or from one of the storage units 555 via the delivery bots 508 or 510. In some embodiments, the apparatus 545 loads or moves the asset 512 from one of the storage units 555 to the delivery bot (508 or 510), which is described in more detail below. In response to the loading of the asset 512 to the delivery bot 508, for example, the delivery bot 508, may then exit the storage racks 540 onto the platform 506, after which one or more portions of the platform 506 may be lowered to a ground surface such that the delivery bot 508 can traverse through the aperture 550 outside of the logistics vehicle 520 in order to deliver the stored asset 512 to a delivery location (e.g., a geo-coordinate corresponding to a front door location) associated with a destination location, such as a dwelling address, which is described in more detail below. Alternatively or additionally, the delivery bot 508 can be configured to load or pick one or more assets from the delivery location (e.g., a front porch or other designated area) and carry the one or more assets to the storage units 555 by picking the one or more assets from the delivery location, traversing to the logistics vehicle 520 and on one or more lowered portions of the platform 506, after which the apparatus 545 may move or load the one or more assets into the appropriate storage unit. Then the delivery bot 508 may traverse back into its storage unit location in the storage racks 540.

In some embodiments, a particular storage unit of the storage units 555 can automatically shift, rotate, or otherwise move to a loading location proximate to the apparatus 545 so that the apparatus can load one or more assets to or from the delivery bots 508 or 510. In some embodiments, the storage units 555 represent the storage structures and related functionality by shifting storage units within a storage space in order to facilitate efficient staging and/or retrieval of assets or parcels as described in U.S. application Ser. No. 16/557,573, titled "Systems, methods, and apparatuses for shifting and staging storage structures and parcels thereon," filed on Aug. 30, 2019, the contents of which are incorporated by reference in its entirety. In some embodiments, the particular storage unit is moved to the loading location based on one or more attributes associated with an asset. For example, a control signal can be sent (e.g., from the logistics server(s) 105) to the storage units 555 causing the appropriate storage unit to be rotated to the loading location based on the destination address or coordinates, size of the asset 512, type of asset 512 (e.g., large package, bag of smalls, envelope, etc.). For example, the storage units 555 may include irregular shaped or different shaped storage units, some of which are each configured to store assets of differing sizes or weights, for example. Accordingly, for instance, if the asset 512 was considered a "small" asset, the storage units 555 may include a first storage unit configured to store smalls.

In an illustration of how the rotating or shifting of the storage units 555 may occur in connection with the other components, the following example is provided. In some embodiments, a telematics device (or other sensor described with respect to FIG. 4) located within the vehicle 520 may receive indication that the vehicle 520 is stopped at (or within a distance threshold of) a particular first location (e.g., via an engine sensor, seatbelt sensor, and/or a location sensor device (e.g., a GPS device)). In response to the receiving of this indication, the vehicle 520 (or other entity described in FIG. 1) can transmit a message to the logistics server(s) 105 and/or determine which storage unit of the storage units 555 include (or need to store) the asset(s) that needs to be dropped off (or picked up from) the particular first location. For instance, a logistics server 105 can receive a message that includes the sensor data from the logistics vehicle 420 and map location sensor data (e.g., location coordinates) to one or more assets via a data structure (e.g., a lookup table). After determining, for example, that a first storage unit is storing (or needs to store) a first asset that is to be dropped off to (or picked up from) the particular location, a control signal may be sent (e.g., by the logistics server(s) 105 and/or the vehicle 120) to the storage units 555 in order to rotate or otherwise move the first storage unit to the loading location adjacent to the apparatus 545. In this way, the apparatus 545 can move the first asset within or on the delivery bot 508 so that the delivery bot 508 can deliver the first asset to the first location or the apparatus can move the first asset into the first storage unit in response to the delivery bot 508 loading the first asset from the first location to the logistics vehicle 520 adjacent to the apparatus 555.

FIG. 5B is a side view of the rear portion of the logistics vehicle 520 of FIG. 5A, according to some embodiments. FIG. 5B illustrates how the platform 506 can adjust to different heights that are substantially flush with the storage racks 540-1 and 540-2 of the storage racks 540 so that the delivery bots 508 or 510 can traverse to or from its individual rack to or from the platform 506 in preparation to load one or more associated assets to or from a storage unit of the storage units 555. In some embodiments, however, the platform 506 need not be adjusted but can be fixed and the racks 540-1 and 540-2 or the storage racks 540 in general can be adjusted or otherwise move the delivery bots 508/510 onto the delivery platform 506. In some embodiments, both the platform 506 and the storage racks 540 are fixed such that they do not move.

FIG. 5B illustrates that the platform 506 is coupled to the shafts 560-1 through 560-4 such that the platform can adjust in a vertical plane (up or down) or axially along any portion of the shafts 560. In some embodiments this adjustment occurs via hydraulics or analogous mechanisms and functionality. For example, fluid, such as water can be pressurized against a piston (represented by an individual shaft 560), which transfers energy into the piston, forcing the shafts 560 to lift (or lower) the platform 506. In some embodiments, the lifting/lowering mechanism of the platform 506 alternatively or additionally includes other suitable mechanisms, such as a scissor lift, a forklift, etc.

The platform 506 includes the upper portion 506-1 and a lower portion (which are coupled together via a hinging component 506-2 (e.g., a spring hinge, pivot hinge, etc.). The lower portion 506-3 includes side rails 506-4 and 506-5 that extend perpendicular to a length of the platform 506. The hinging component 506-2 allows the upper portion 506-1 and lower portion 506-3 to rotate relative to each other about a fixed axis of rotation. In this way, when the platform is lowered through the aperture 550, the delivery bots 508 and 510 can launch with less chance of tipping or being otherwise perturbed. For example, in some embodiments in response to the delivery bot 508 or 510 driving onto the platform 506 (with an asset already loaded therein), the platform 506 can lower to a plane substantially parallel or flesh with a surface of the bottom portion 570 of the logistics vehicle 520 as illustrated in FIG. 5A. Then, the top edge 506-1A of the upper portion 506-1 can stay fixed to the bottom portion 570 while the rest of the platform 506 is not fixed and lowers to a street level or ground surface through the aperture 550 such that there is a decline (or incline) or ramp formed between the ground surface and the bottom portion 570 of the logistics vehicle 520. Accordingly, the upper portion 506-1 may be oriented in a first angel (e.g., ~45 degrees) and contact a ground surface at or near an area near the hinge component 506-2. The hinge component 506-2 may cause the lower portion 506-3 to be oriented at a second angle that is substantially flush or parallel to the ground surface. In this way, the upper portion 506-1 and lower portion 506-3 may rotate relative to each other and form an angle about a fixed axis at the hinge component 506-2. Accordingly, the delivery bots 508 or 510 may smoothly transition from the ramp 506 to a ground surface.

In some embodiments, the platform 506 need not include the hinge component 506-2 and/or any portion, such as the edge 506-1A need not be fixed to the bottom surface 570. Rather, in particular embodiments, the entire platform 506 can be lowered through the aperture 550 directly to a ground surface such that each portion of the platform 506 is substantially flush or parallel to the ground surface, as opposed to embodiments where only portions of the platform 506 contact the ground surface such that a ramp or incline/decline is formed.

FIG. 6 is a schematic diagram of an example Unmanned Ground Vehicle (UGV) delivery bot 600, according to some embodiments. It is understood that the UGV 600 can come in alternative forms, such as a: Unmanned Arial Vehicle (UAV), robot, drone, unpiloted aircraft or remote control vehicle, or the like that is configured to store or receive one or more assets, traverse (via air space or on a ground surface) to a particular geographical location, and drop off the one or more assets at the particular geographical location (e.g., geo-coordinates). One or more of these alternative forms may include one or more of the components described in FIG. 6. In some embodiments, the delivery bot 600 represents the delivery bot 508 and/or 510 of FIGS. 5A and 5B, and or the delivery bot 123 of FIG. 1.

The UGV 600 includes the sliding top cover 613, the asset platform 617, the scissor lift 615, the computing unit 630 (e.g., a computing entity 100 of FIG. 2), the set of wheels 630, and an aperture 621 that defines the opening to the top surface 619. The UGV 600 is configured to carry or receive one or more assets to deliver to or from an apparatus (e.g., the apparatus 545). In some embodiments, the UGV 600 is configured to receive one or more assets from an apparatus (e.g., the apparatus 545) and drop the one or more assets off at a destination address or location (e.g., particular geo-coordinates). In these embodiments, the apparatus can push, grab, or otherwise move the one or more assets from a storage unit onto the sliding top cover 613 (while the top cover overlays the top surface 619) such that there is no exposed aperture 621 (e.g., the aperture 621 is not apparent from a view outside of the UGV 600) and there is an enclosure. After the sliding top cover 613 slides open such that there is an exposed aperture 621 (e.g., the aperture 621 is discernable or apparent from a view outside of the UGV 600) and the sliding top cover 613 no longer overlays all of the top surface 619, the asset platform 617 may receive the one or more assets based on, for example, gravitational forces that pull the one or more assets from the sliding top cover 613 to the asset platform 617. After the platform 617 receives the one or more assets, the sliding top cover 613 may once again slide over the top surface 619 so as to enclose the one or more assets on all sides and such that the aperture 621 is closed or is no longer exposed. In some embodiments, one or more sensors (not shown) may be used to instruct the UGV 600 to open the sliding top cover 613 to open for asset storage. For example, the UGV 600 may include one or more pressure sensors that sense a pressure over a threshold on a top surface of the sliding top cover 613 (e.g., in response to an apparatus (e.g., the apparatus 545) moving an asset on a top surface of the top cover 613). In response to a detection over the threshold, the sliding top cover 613 may move from a closed position (i.e., the aperture 621 is not exposed and the sliding top cover 613 overlays the entire top surface 619), to an open position (i.e., the aperture 621 is exposed and the sliding top cover 613 slides to an area parallel to the top surface 619 such that a portion of the top surface 619 is not covered or overlaid by the top sliding top cover 613). In another example, the UGV 600 or apparatus within a logistics vehicle may include a range finder, camera with object detection capabilities, and/or any other suitable sensor that detects or determines that an apparatus is preparing (e.g., moving its components or an asset) to load an asset. In response to this detection, the UGV 600 can be instructed to open the sliding top cover 613 such that one or more assets can be loaded directly onto the platform 617, as opposed to being directly loaded onto the sliding top cover 613.

In some embodiments, one or more other sensors are used to lower the scissor lift 615 and/or close the sliding top cover 613 in response to a detection that one or more assets have been loaded onto the platform 617. For example, a pressure sensor can detect a pressure over a threshold on the top surface of the platform 617. Responsive to this detection, the scissor lift 615 can adjust its orientation or collapse such that the platform 617 lowers, causing the one or more assets stored thereon to also lower through the aperture 621. In response to this lowering (e.g., such that the one or more assets are completely or substantially within the body 670 of the UGV 600 and/or do not protrude through the aperture 621), the sliding op cover 613 can slide back (e.g., automatically) to its closed position such that the sliding top cover 613 slides over top of the one or more enclosed assets such that none of the assets are viewable.

In some embodiments, in response to the sliding top cover 613 sliding over top of the one or more enclosed assets, the UGV 600 can begin (e.g., automatically by rotating its wheels 630) traversing towards its destination location. In some embodiments, the UGV 600 uses its own sensor data to locate a destination location. For example, the UGV 600 can include an antenna or other protrusion that extends vertically from a portion of the sliding top cover 613. At the top of the protrusion there may be a lidar sensor and/or any other sensor (e.g., camera, radar, etc.) described with respect to the logistics vehicle 420 of FIG. 4. Such sensor can detect the geographical surroundings of the UGV 600 in order to guide the UGV 600 to its appropriate location. For example, the UGV 600 may generate an HD map or other geographical map indicating the exact location (e.g., a front porch of a particular house) to drop off the loaded one or more assets.

Alternatively or additionally, in some embodiments the UGV 600 uses sensors or data used on other components such as a logistics vehicle for guidance to a particular delivery location. For example, in some embodiments a logistics vehicle includes a tethered drone or UAV with a 3D mapping sensor array (e.g., lidar, radar, or any sensor described with respect to FIG. 4) that provides real-time or near-real-time delivery instructions to the UGV 600 based on the readings it detects from the tethered drone or UAV. In these embodiments, the UAV can monitor the UGV 600 positioning or coordinates because the UAV 600 may exchange positional data with the UAV. Alternatively or additionally, some logistics vehicle embodiments include a long telescopic arm that raises vertically with a 3D mapping sensor array (e.g., a lidar, radar, or any sensor described with respect to FIG. 4). This sensor array provides a 3D map of the surrounding terrain, thereby providing an arial or top view that provides a view over fences and walls, for example. Accordingly, the logistics vehicle or logistics server provides real-time or near-real-time delivery instructions to the UGV 600 based on the readings it detects from the tethered drone or UAV. In these embodiments, the 3D mapping sensor array can monitor the UGV 600 positioning or coordinates because the UAV 600 may exchange positional data with the 3D mapping sensor array.

In some embodiments, the logistics server(s) 105 and/or logistics vehicle 120 (or any component stored therein, such as the apparatus 545) can transmit data to the computing unit 630 (e.g. via a receiver) indicating a particular geo-coordinate (e.g., latitude and longitude) or location that the UGV 600 needs to travel to, navigational instructions, destination address, and/or any service level data (e.g., special requests for delivery locations, type of package (e.g., fragile), date of delivery, etc.). In this way, these components can be communicatively coupled. The UGV 600 may then traverse to the destination location based on the transmitted data. For example, if the UGV 600 receives an indication that a stored package is fragile, it may trigger a control signal causing the UGV 600 to go slower than it otherwise would to avoid rattling or breakage of the stored package.

In some embodiments, in response to the UGV 600 reading its own sensor data and/or analyzing the transmitted data (e.g., navigational instructions, service level data) described above, the UGV 600 may then unload the one or more assets from the platform 617 to the particular destination location according to the transmitted data and/or the sensor data. In some embodiments, the unloading may occur in any suitable manner. In an illustrative example of how the UGV 600 may unload one or more stored assets, the UGV 600 may stop at a destination location based on sensor data or other received indications, such as the transmitted data. Responsively, the sliding top cover 613 can automatically open from a closed position such that the aperture 621 is exposed and the one or more assets are viewable. In response to the sliding top cover 613 opening, the scissor lift 615 can automatically activate via a springing action or other spring mechanism (e.g., a compression spring) thereby causing the platform 617 and the one or more stored assets to spring or move through aperture 621 to an area outside of the UGV 600. In this way, in some embodiments, the scissor lift 615 can act as a mechanism that loads or stores potential energy when loaded or collapsed and releases the potential energy to kinetic energy when unloading or extending, thereby causing a springing action of the one or more assets through the aperture 621 to an area outside of the UGV 600. Alternatively, in some embodiments, the platform 617 need not be spring loaded but can raise such that another mechanism can pick an asset stored thereon.

In some embodiments, in response to the UGV 600 unloading the one or more assets to the destination location, the UGV 600 generates a proof-of-delivery indication (e.g., a timestamp and message indicating that a package has been dropped off) and transmits this indication to the logistics server 105, mobile computing entity 110, and/or logistics vehicle 120 (and/or any suitable component within the logistics vehicle 120). In some embodiments, in response to the transmission or generation of this indication, the UGV 600 initiates traversing back to its storage unit location. For example, referring back to FIG. 5A, in response to transmitting this indication, the logistics server(s) 105 can send a control signal to the platform 506 to lower the platform 506 and/or to the UGV 600 instructing the UGV 600 to traverse back to its storage location (e.g., a particular storage rack of the storage racks 540) via an IR sensor, lidar, or any other suitable sensor described above with respect to FIG. 4. Accordingly, for example, using a lidar, the UGV 600 can traverse from a destination location (e.g., a front door step) up through the platform 506 back to a storage rack 540-1.

In some embodiments, the UGV 600 is alternatively or additionally used to carry one or more assets to an apparatus within a logistics vehicle, as opposed to only carrying one or more assets from the one or more storage units to one or more final-mile-delivery addresses, geo-coordinates, or geographical areas outside of the logistics vehicles. In these embodiments, for example, a shipper may place an asset outside of his or her dwelling or other location so that the UGV 600 can load the asset from the location into a logistics vehicle to continue shipment processing (e.g., traverse through a sorting facility and to a final-mile-delivery vehicle for delivery at a destination address).

The UGV 600 may carry one or more assets to the apparatus in any suitable manner. For example, in response to a logistics vehicle making a stop, the logistics vehicle and/or logistics server(s) may instruct the UGV 600 to pick up or load an asset at particular geo-coordinates or location (e.g., a mailbox or porch). Responsively, in some embodiments, the platform 506 raises (or lowers) to a position substantially parallel or flush with a particular storage rack where the UGV 600 is stored. Responsively, in some embodiments the UGV 600 using its own sensor data (e.g., lidar sensor data or any sensor data described with respect to FIG. 4) and/or external data (e.g., navigational instructions) from the logistics vehicle and/or logistics server can traverse outside of its storage rack (e.g., 540-1) onto a platform (e.g., the platform 506). Responsively, the platform can be lowered to a ground surface such that the UGV 600 traverses outside of the logistics vehicle (e.g., through the aperture 550) to the particular location where the asset needs to be picked up from. In response to the UGV 600 making a stop at the particular location, the UGV 600 can pick, load, and/or store the asset into the body 670 of the UGV 600. For example, the particular location may include a container, mailbox, or other storage unit that houses an asset, which automatically drops the asset down unto the platform 617 (when the sliding top cover 613 is in an open position) and/or the sliding top cover 613 (when the sliding top cover 613 is in a closed position) in response to being communicatively coupled or receiving a control signal (e.g., from the logistics server(s) 105) to release the asset. In these embodiments, the particular stopping area for the UGV 600 at the particular location may be directly under the container or other storage unit so that the container can drop the asset directly onto the UGV 600.

Using a pressure sensor, other sensor, or other information described above, the asset can then be lowered into the body 670 by collapse of the scissor lift 615 and the sliding top cover 613 can slide into a closed position such that the stored asset is not visible. Responsively, using the lidar sensor, other sensor, or other information provided by the logistics server(s) 105, and/or logistics vehicle, the UGV 600 can then traverse from the stopping location back over the platform 506, through the aperture 550. Responsively, in some embodiments, a storage unit within the logistics vehicle (e.g., a storage unit of the storage units 555) automatically receives a control signal (e.g., from the logistics server(s) 105) to rotate to a loading location based on one or more attributes associated with the asset being loaded (e.g., size of asset, destination address, other service level data). Additionally, the platform 506 may also automatically be raised to the loading location based on receiving a control signal (e.g., from the logistics server(s) 105) or other information associated with the loaded asset. Responsively, in some embodiments, an apparatus (e.g., the apparatus 545) then picks or otherwise moves the asset from the platform (e.g., the platform 506 or platform 613) to the storage unit, which is described in more detail below.

FIG. 7 is a front view of a system 700 for loading one or more assets to or from a delivery bot 710 via an apparatus 740, according to some embodiments. The system 700 includes the storage unit 730 (including the components 730-1, 730-2, and 730-3), the apparatus 740, the delivery bot 710, and a storage rack 750 that stores the delivery bot 710. In some embodiments, the system 700 represents the corresponding components of FIG. 5A. For instance, in some embodiments, the storage units 555 may include the storage unit 730, the delivery bot 710 may represent the delivery bot 510, the apparatus 740 may represent the apparatus 545 (From the same front view perspective), and the storage rack 750 may represent one of the storage racks 540.

In some embodiments, the system 700 illustrates that the asset 705 is loaded or moved from the rack 730-1 of the storage unit 730 into the delivery bot 710 via the apparatus 740. In these embodiments, asset loading components, such as the set of rods 740-2 and 740-1 may slide in the aperture or gap 780 between a top surface of the asset 705 and the top shelf 730-3 of the storage unit 730 toward the back surface 760 (e.g., a back wall of the storage units 730). An "asset loading component" as described herein is any suitable article of manufacture or component (or set of components) that physically abut against at least a portion of one or more assets to pull, catch, shift, or otherwise move the asset. Although the asset loading components are illustrated in FIG. 7 as the set of rods 740-1 and 740-2 (which include the extensions 740-3 and 740-4), the asset loading components can take on or include an suitable form, such as a plate, panel, netting, fingers, and/or the like.

In some embodiments the set of rods 740-2 and 740-1 are rotated clockwise or counter clockwise such that the corresponding extensions (e.g., extension 740-1) catches a portion of the asset 705 (e.g., a top portion of the sidewall). The functionality and other components of the apparatus 740 are described in more detail below. In some embodiments, in response to the rotation of the sets of rods 740-1 and 740-2 the extensions 740-3 and 740-4 also rotate such that the extensions catch a portion of the asset 705. The set of rods 740-1 and 740-2 may then slide away or frontward from the back surface 760 (e.g., and toward the general direction of the back of the logistics vehicle 520, such as toward the doors 514 and 516) such that the asset 705 is pulled or moved from the rack 730-1 to the platform 713 (in a closed position) of the delivery bot 710 and/or into the body 781 of the delivery bot 710. In some embodiments, the delivery bot 710 represents the UGV 600 and vice versa.

As illustrated in FIG. 7, the apparatus 740 is configured to be placed over (e.g., but not touching) the storage unit 730 or one or more boundaries of the storage unit 730. Specifically, for example, the component 740-5A (described in more detail below) of the apparatus 740 can be place over the vertical frame 730-2 of the storage unit. Further, the top frame 740-A (described in more detail below) can be placed over the storage rack 730-3. As illustrated in FIG. 7, the storage rack 730-3 can included its own set of assets, including a slotting grill 735, which includes a plurality of slots each configured to receive particular parcels, such as envelopes.

In some embodiments, FIG. 7 alternatively or additionally illustrates that the asset 705 can be loaded from the delivery bot 710 onto the rack 730-1 of the storage unit 730 (as opposed to loading the asset 705 from the rack 730-1 to the delivery bot 710). In these embodiments, the platform 713 can slide to an opening position (e.g., as described with respect to FIG. 6). In some embodiments, the delivery bot 710 includes a platform and scissor lift, such as the platform 617 and 630 as described with respect to FIG. 6. Accordingly, the scissor lift can extend thereby causing the platform and asset to extend to a surface substantially planar or even with the platform 713. The apparatus 740 may then grab and move the asset 705 from the platform (e.g., the platform 617) to the rack 730-1. For example, the apparatus 740 may include an object detection camera sensor that detects the asset 705 or otherwise receive an indication (e.g., from the logistics server(s) 105) that the asset 705 is ready to be loaded onto the rack 730-1. The set of rods 740-2 and 740-1 may then extend from the back surface over the asset 705 loaded on the platform (e.g., the platform 617) and cause extensions to catch a portion of the asset 705 and cause the asset to be moved to the rack 730-1 by causing the rods 740-1 and 740-2 to move frontward to rear-word toward the back surface 760, as described above. In some embodiments, extensions identical or similar to the extension 740-4 may be included on the ends 740A and 740B in order to perform the loading into the rack 730-1 described above.

FIG. 8 is a rear view of the apparatus 740 and the storage rack 750 of FIG. 7, according to some embodiments. FIG. 8 illustrates that vision sensors 740-13A and 740-13B can be used to guide the set of rods 740-1 and 740-2 over one or more assets such that the set of assets are loaded from a storage unit into a delivery bot of the storage rack 750. FIG. 8 illustrates that the storage rack 750 is coupled to the apparatus 740 via the fastening plates 740-14a and 740-15B.

FIG. 8 also illustrates example embodiment components that the apparatus 740 can include to load one or more assets. The apparatus 740 helps moves one or more assets via using the vision sensors 740-13A and 740-13B to guide the rods 740-1 and 740-2 over one or more assets to catch and load the one or more assets. In particular embodiments, the vision sensors 740-13A and 740-13B use object detection or classification algorithms to detect assets. In response to detecting one or more dimensions (e.g., length, width, depth) of the one or more assets, embodiments determine the exact positioning (e.g., in X, Y, Z planes) that the rods need to be placed at based on the one or more dimensions in order to move the detected asset to or from a delivery bot in the storage rack 750. In this way, the rods 740-1 and 740-2 can move vertically (up and down) via the vertical shafts 740-7A and 740-7B (and/or 740-6A and 740-6B) and can move horizontally (sideways) via the horizontal shafts 740-10 and 40-12. The rods 740-1 and 740-2 can also move its extensions 740-3 and 740-4 front to back/back to front (frontward and rear-word) in a linear manner (e.g., from the back surface 760 to above the delivery bot 710) to move the one or more assets to or from a delivery bot.

As illustrated in FIG. 8, the coupling components 740-9A, 740-9B, 740-11A, and 740-11B are configured to receive the shafts 740-10 and 740-12 and can slide or move linearly and horizontally/laterally along a length of the shafts 740-10 and 740-12 such that the rods 740-1 and 740-2 can move side-to-side. Such side-to-side movement is possible because the coupling components 740-9A, 740-9B, 740-11A, and 740-11B, are coupled to a common backbone plate 740-20A and 740-20B, which are described in more detail below. The common backbone plate 740-20A and 740-20B are also coupled to an actuator component 740-8A (e.g., which includes a computing unit 110) and actuator component 740-8B (described in FIG. 9B)) and the actuator components 740-8A and 740-8B are also coupled to the coupling component 740-60A and 740-60B (described in FIG. 9B), which receives the respective rods 740-1 and 740-2. The actuator components 740-8A and 740-8B are further coupled to the vision sensors 740-13A and 740-13B. Accordingly, in response to the vison sensors 740-13A and 740-13B detecting a particular dimension (e.g., a length) of an asset, the actuator components 740-8A and 740-8B, which may have a motor or computing unit, may cause movement of the common backbone plate 740-20A and 740-20B and the rods 740-1 and 740-2 in a horizontal plane along the shafts 740-10 and 74012. In another example, in response to the vison sensors 740-13A and 740-13B detecting another particular dimension (e.g., a height) of an asset, the actuator components 740-8A and 740-8B, which may have a motor or computing unit, may cause movement of the common backbone plate 740-20A and 740-20B and the rods 740-1 and 740-2 in a vertical plane along the shafts 740-7A, 740-7B, 740-6A, and/or 740-6B. In some embodiments, each of the rods 740-1 and 740-2 move independently relative to each other. In this way, these rods do not have to perform the same movements (in the X, Y, and/or Z plane) at the same time. For example, the rod 740-1 can move in a Z-plane (e.g., front to back) while the other rod 740-2 remains stationary.

As illustrated in FIG. 8, the top frame 740-A defines a top portion of the apparatus 740. The shafts 740-6A, 740-6B, and the shafts 740-7A and 740-7B are coupled to the top frame 740-A. The apparatus 740 also includes the side frame components 740-5A and 740-5B, which couple the shafts 740-10, 740-12, 740-6A, and 740-6B. The apparatus 740 also includes the stopper components 740-14A and 740-14B, which are configured to stop, hold, or keep other assets from being loaded to or from a delivery bot, as described in more detail below with respect to FIG. 9A.

FIG. 9A illustrates a rear view of the apparatus 740 of FIG. 8 and also illustrates how the apparatus 740 selectively moves an asset 900 from a storage unit 933 to a delivery bot 910 from a rear view, according to some embodiments. As illustrated in FIG. 9A, the extensions 740-3 and 740-4 can be rotated over a top portion 900-1 of the asset 900 such that the extensions 740-3 and 740-4 catch or grab the asset 900 (e.g., the edge 900-2) in response to the rods 740-1 and 740-2 moving in linear and planer fashion (backward to forward) closer to the delivery bot 910. As illustrated in FIG. 9A, the extensions 740-3 and 740-4 cause the asset 900 to be moved or loaded from the storage unit 933 into the a body 921 of the delivery bot 910 (or the platform 913 when the platform 913 is in a closed position). As further illustrated in FIG. 9A, the assets 905 and 903 are not moved from the storage unit 933 to the delivery bot 910. This is because the stopper components 740-14A and 740-14B stop, do not move, or otherwise prevent the assets 903 and 905 from being moved to the delivery bot 910. The stopper component 740-14A and 740-14B are fixed relative to the rods 740-1 and 740-2 in a front-to-back/back-to-front plane.

In an illustrative of how the apparatus 740 moves the parcel 900 to the delivery bot 910 and prevents the other parcels 903 and 905 from being moved, the following example is provided. At a first time, the storage unit 933 may be automatically shifted to a loading location (e.g., as described with respect to FIG. 5A). At a second time subsequent to the first time, the vision sensors 740-13A and 7740-13B may detect the dimensions or contours of each of the assets 900, 903, and 905. For instance, embodiments can place a logical bounding box over each logical representation of the assets 900, 903, and 905 to detect 3 different assets. A bounding box describes or defines the boundaries of the object in terms of the position (e.g., 2-D or 3-D coordinates) of the bounding box. For example, the bounding box can be a rectangular box that is determined by its x and y axis coordinates. This gives object recognition systems indicators of the spatial distinction between objects to help detect the objects. At a third time subsequent to the second time, the actuator components 740-8A and 740-B may cause the common backbone plate 740-20A and 740-20B to move at an axis along a length the shafts 740-10 and 740-10 based on the bounding box location or dimensions detected with each asset and the actual asset that needs to be loaded into the delivery bot 910.

In some embodiments, using object detection, the stopper components 740-14A and 740-14B are moved along the length of the shafts 740-10 and 740-12 (i.e., side-to-side) in response to or based on the stopper components 740-14A and 740-14B being detected near an edge or other portion of the assets 903 and 905 (or near their associated bounding boxes). Accordingly, movement along the shafts 740-10 and 740-12 may occur if and until this detection at which point the movement stops such that the stopper components 740-14A and 740-14A are fixed. In this way, when the asset 900 is moved from the storage unit 933 to the delivery bot 910, the other assets 903 are not also moved. At a fourth time subsequent to the third time, the actuator components 740-8A and 740-B may cause the rods 740-1 and 740-2 to extend (e.g., move from font to back) over the top of the asset 900. In some embodiments, at a fifth time subsequent to the fourth time, the actuator components 740-8A and 740-B may further cause the extensions 740-3 and 740-4 to rotate 90 degrees (or any other suitable position), as illustrated if FIGS. 8 and 9A. FIG. 8 illustrates that the extensions 740-3 and 740-4 are oriented in a horizontal plane parallel to a length of the shafts 740-10 and 740-12, for example. FIG. 9 illustrates that the extensions 740-3 and 740-4 have rotated about 90 degrees (relative to the extensions 740-3 and 740-4 as illustrated in FIG. 8) from the horizontal plane to a vertical plane, which is substantially perpendicular to a length of the shafts 740-10 and 740-12 (or now parallel to the length of the shafts 740-7A and 740-7B). In some embodiments, at a sixth time subsequent to the fifth time, the actuator components 740-8A and 740-B may further cause the rods 740-1 and 740-2 (and thus the connected extensions 740-3 and 740-4) to be pulled or moved from a back-to-front horizontal plane, thereby causing the asset to be moved from the storage unit 933 to the delivery bot 910. In various embodiments, each of the functionality described with respect to the first through sixth time occur automatically and do not require human or other manual intervention.

In some embodiments, the extensions 740-3 and 740-4 need not catch a top surface 900-2 of the parcel 900 to move the parcel 900 as illustrated in FIG. 9A. Rather, these components can alternatively be located at and catch at any suitable surface of the parcel 900 to move the parcel. For example, in some embodiments, the extensions 740-3 and 740-4 (and the corresponding rods 740-1 and 740-2) can be located at or catch a side surface of the parcel 900 to move the parcel from the storage unit 933 to the delivery bot 910.

FIG. 9B illustrates a front view of the apparatus of FIG. 8 and FIG. 9A and also illustrates how the apparatus 740 selectively moves an asset 900 from the storage unit 933 to the delivery bot 910 from a front view, according to some embodiments. Accordingly, FIG. 9B represents each of the components and functionality of FIG. 9A, except that the components and functionality are illustrated at a front view (e.g., the same view as illustrated in FIG. 7 and FIG. 5A as viewed from a back portion of the logistics vehicle 520), as opposed to a rear view. As illustrated in FIG. 9B, the rods 740-1 and 740-2 slide in a horizontal plane (e.g. parallel to the plane of a top surface of the asset 900) toward the delivery bot 910 (and away from the storage unit 933), which causes the extensions 740-4 and 740-3 to catch the asset 900, thereby moving the asset 900 from the storage unit 933 into the body 921 of the delivery bot 910. Additionally, the stopper component 740-14A (and 740-14B) prevent or keep the asset 903 (and 905) from also being moved from the storage unit 933.

FIG. 9B further illustrates additional components not illustrated in FIG. 8 or FIG. 9A or gives a more complete view of some of the components of FIG. 8 and FIG. 9A. For instance, the shaft 740-70 extends along a length of and attaches to the top frame 740-A. The shaft 740-70 also runs through the coupling components 740-60A and 740-60B, which couple both the shaft 740-70 and shafts 740-7A and 740-7B together. FIG. 9B also illustrates the common backbone plate 740-20A and 740-20B further coupling to the coupling components 740-50A and 740-50B respectively, which allows the shafts 740-7A and 740-7B to be coupled to the common backbone plates 740-20A and 740-20B. The computing units 740-8A and 740-8B are also illustrated as being coupled to the respective common backbone plates 740-20A and 740-20B. The coupling of all these components together allows the rods 740-1 and 740-2 to move in any suitable direction (e.g., X, Y, and Z planes) in order to conform or fit around the asset 905 to move the asset 905 to the delivery bot 910.

IV. EXEMPLARY SYSTEM OPERATION

FIG. 10 is a flow diagram of an example process 1000 for causing a delivery bot to deliver one or more assets to a delivery location, according to some embodiments. The process 1000 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments, the process 1000 only includes the block 1004 (and not blocks 1002 and 1006) or blocks 1004 and 1006 (and not block 1002). Any added blocks may include blocks that embody any functionality described herein. The computer-implemented method, the system (that includes at least one computing device having at least one processor and at least one computer readable storage medium), and/or the computer program product/apparatus as described herein may perform or be caused to perform the process 1000, and/or any other functionality described herein.

Per block 1002, a storage unit is caused (e.g., by the logistics server 100 and/or the logistics vehicle 120) to be rotated to a loading location adjacent to an apparatus. In some embodiments, prior to moving one or more assets, the storage unit is caused to automatically rotate to a position adjacent to the apparatus in preparation for the apparatus to place or pick up the one or more assets from the storage unit (described with respect to block 1004). For example, referring back to FIG. 7, the storage unit 730 can rotate to a position adjacent to the apparatus 740 so that the apparatus 740 can move the asset 705 from or to the storage unit 730 (e.g., as described with respect to block 1004). In some embodiments, a logistics vehicle includes a rotatable storage unit system that automatically rotates per block 1002. For example, referring back to FIG. 5A, the logistics vehicle 520 includes the storage units 555.

In some embodiments, the apparatus described in block 1002 is disposed over one or more boundaries of the storage unit. For example, referring back to FIG. 7, the apparatus 740 is disposed over various boundaries of the storage unit 730. Specifically, for example, the shaft 740-70 of the apparatus 740 runs parallel to and over the top shelf 730-3 of the storage unit 730. In this way, the apparatus 740 can have access to any area within the storage unit to load or unload one or more assets stored therein (e.g., as described at block 1004). In various embodiments, the apparatus is disposed over but not abutting, fixed to, or otherwise coupled to the one or more boundaries. This is because in some embodiments, storage units are rotatable such that another storage unit is configured to rotate to the loading location or adjacent to the asset loading component to move other assets to a delivery bot. For example, Referring back to FIG. 5A, any storage unit of the storage units 555 can be shifted or otherwise move to a loading location near the apparatus 545 at different times. For example, a first storage unit of the storage units 555 can be shifted to a loading location near the apparatus 545 at a first time so that the apparatus 545 can load (e.g., at block 1004) a first asset into the delivery bot 508. At a second time subsequent to the first time, a second storage unit of the storage units 555 can be shifted to the same loading location near the apparatus 545 so that the apparatus 545 can load (e.g., at block 1004) a second asset into the delivery bot 510. In this way, each asset stored in each storage unit can be picked from the storage unit at the loading location for delivery via the delivery bots.

In some embodiments, the logistics vehicle includes a plurality of delivery bot storage racks that are each configured to receive a respective delivery bot. Further, in some embodiments, each of the plurality of delivery bot storage racks are vertically aligned one with another at a rear portion of the logistics vehicle. For example, referring back to FIG. 5A and FB, delivery bot storage racks 540 are located at the rear of the logistics vehicle 520 (e.g., adjacent to the door 514). FIG. 5B illustrates that the individual storage racks 540-1 and 540-2 are vertically aligned or stacked on top of each other with a particular quantity of space or distance between the storage racks 540-1 and 540-2.

In some embodiments, a system includes a logistics vehicle that includes one or more storage units and is configured to carry one or more assets for one or more shipping operations (e.g., final-mile delivery of an asset to a destination address or geo-coordinate), as described, for example with respect to the logistics vehicle 520 of FIG. 5A. In some embodiments, the system includes an apparatus included in the logistics vehicle. In some embodiments, the apparatus includes one or more asset loading components (e.g., the rods 740-1 and 740-2, and the extensions 740-3 and 740-4) configured to automatically move the one or more assets to or from the one or more storage units to or from a delivery bot inside of the logistics vehicle, as described for example, with respect to the apparatus 545 of FIG. 5A and/or the apparatus 740.

In some embodiments, the system further includes a launch component inside of the logistics vehicle. The launch component is configured to allow the delivery bot to traverse outside of the logistics vehicle or inside of the logistics vehicle in order to complete the one or more shipping operations. For example, the "launch component" may be or represent the platform 506 of FIGS. 5A and 5B and perform any associated functionality of the platform 506 described herein.

Per block 1004, the one or more assets are caused (e.g., by the logistics vehicle 120 and/or the logistics server(s) 105) to be moved, via the apparatus (e.g., via communicatively coupling with the apparatus), from the storage unit to a delivery bot. In various embodiments, the apparatus includes one or more asset loading components (e.g., the rods 740-1 and 740-2) that are configured to move the one or more assets from one or more storage units to the delivery bot where the delivery bot is configured to deliver the one or more assets outside of the logistics vehicle to the one or more delivery locations in response to the moving of the one or more assets at block 1004. For example, block 1004 can include some or all of the functionality as described with respect to the apparatus 545 and 745 of FIG. 5A, FIG. 7, FIG. 8, FIG. 9A, and FIG. 9B. Alternatively or additionally, however, in some embodiments, the one or more assets are moved from the delivery bot to the storage unit, as described, for example, with respect to FIG. 6 where assets can be picked up, by a delivery bot, from a geographical location, such as a shipper address, traverse to a location within the logistics vehicle, and an apparatus can pick the assets from the delivery bot and loaded into a storage unit.

In some embodiments, the apparatus automatically moves the one or more assets to or from one or more storage locations to or from the delivery bot (e.g., as represented by FIGS. 9A and 9B). And in some embodiments, the apparatus and the one or more storage units and the delivery bot are stored in a logistics vehicle (e.g., as described with respect to FIG. 5A). In some embodiments, the apparatus includes one or more sensors configured to automatically guide the one or more asset loading components to the one or more assets for the moving of the one or more assets from the one or more storage units to the delivery bot. For example, the one or more sensors may include one or more vision sensors and the automatically moving of the one or more assets to or from the one or more storage units occurs in response to the vision sensor located on the apparatus sensing contours, edges, and/or dimensions of the one or more assets and guiding the apparatus (or asset loading component(s)) for the moving of the one or more assets. This is described, for example, with respect to the vision sensors 740-8A and 740-8B of the apparatus 740.

In some embodiments, the one or more asset loading components include a set of rods and the set of rods each include an extension (e.g., a lip, projection, protrusion, or bulge) that is configured to catch (or pull) the one or more assets for the moving of the one or more assets. For example, the set of rods and extensions may include the rods 740-1 and 740-2 and the associated extensions 740-3 and 740-4 as described herein. In some embodiments, the apparatus includes an actuator component configured to place at least a portion of the set of rods over a top portion of the one or more assets and cause rotation of the extension such that the extension catches an edge of the one or more assets. For example, as described with respect to FIGS. 9A and 9B, the actuator components 740-8A and 740-8B may cause the set of rods 740-1 and 740-2 to be placed over the top portion 900-1 of the asset and cause rotation of the extensions 740-3 and 740-4 (e.g., relative to the positions of the extensions 740-3 and 740-4 as illustrated in FIG. 8) such that the extensions 740-3 and 740-4 catches the edge 900-2 of the asset 900. This catching in embodiments allows for the asset to be moved from the storage unit (e.g., storage unit 933) to a delivery bot (e.g., delivery bot 910) via forward and rearward movement of the one or more asset loading components (e.g., as described with respect to FIG. 9A). In some embodiments, this "rotation" of the extension includes causing rotation of the extension from being substantially parallel with a horizontal edge of a top of the one or more assets to a position that is substantially perpendicular to the horizontal edge of the one or more assets. For example, referring back to FIGS. 8 and 9A, the extension 740-3 illustrates that it is substantially parallel with a horizontal edge (e.g., the edge 900-2) of the top (e.g., the top portion 900-1) of the asset (e.g., asset 905). The extensions as represented in FIG. 8A can be rotated to the position illustrated in FIG. 9A, which illustrated that the extensions 740-3 and 740-4 is in a position that is substantially perpendicular to the horizontal edge (e.g., the edge 900-2) of the one or more assets.

In some embodiments, the apparatus includes one or more stopper components that are configured to prevent other assets from being moved to the delivery bot. For example, referring back to FIG. 9B, the stopper component 740-14A prevents the asset 903 from being moved to the delivery bot 910 by applying pressure against or otherwise abutting a surface of the asset 903 such that the asset 903 does not get pulled or move in a general direction toward the delivery bot 910. In alternative or additional embodiments, the apparatus prevents other assets from being moved from the delivery bot (e.g., to a storage unit). For example, referring back to FIG. 9B, in some embodiments the stopper component 740-60A may be configured or manufactured to rotate 108 degrees from the position illustrated in FIG. 9B such that if the assets 900, 903, and 905 were each located on the platform 913, for example, the stopper component 740-14A may prevent the asset 903 from being loaded onto the storage unit 933 from the delivery bot 910 (and likewise, the other stopper component 740-14B can prevent the asset 905 from being loaded onto the storage unit 933), thereby allowing the asset 900 to be loaded onto the storage unit 933 from the delivery bot 910.

In some embodiments, each of a plurality of asset loading components is configured to move independently one from another for the moving of the one or more assets. For example, as described herein, each of the rods 740-1 and 740-2 can move independently relative to one another, as opposed to being moved at the same time or in parallel together.

Per block 1006, a delivery bot may be caused to deliver the one or more assets to a delivery location. In some embodiments, a "delivery location" is a destination address, geofenced area, geo-coordinates, geographical feature (e.g., porch, backyard), and/or any other geographical area (e.g., as part of a final-mile delivery). Alternatively, in some embodiments, a "delivery location" represents a particular storage unit (e.g., inside a logistics vehicle) or any other area within a logistics vehicle, such as a loading location. In some embodiments, the delivery bot is configured to deliver or pick up the one or more assets to or from one or more delivery or pick up locations that are outside of the logistics vehicle, as described for example with respect to FIG. 6.

In some embodiments, the launch component described with respect to block 1002 is configured to raise and lower in a vertical plane to each of the plurality of storage units to receive a respective delivery bot, as described for example, with respect to FIG. 5B. In some embodiments, the launch component includes a first end that is configured to lower from the logistics vehicle to a ground surface beneath the logistics vehicle such that the launch component becomes a ramp for a particular delivery bot. For example as described with respect to FIG. 5B, the lower portion 506-3 is configured to lower to a ground surface beneath the logistics vehicle 520 (e.g., while the upper portion 506-1 remains fixed to the bottom surface of the logistics vehicle 520) so that the delivery bots 510 and/or 508 can traverse up or down the platform 506 as described with respect to FIG. 5B in order to deliver the asset(s) to the delivery location per block 1006.

In some embodiments, the logistics vehicle and/or computing device (e.g., the logistics server(s) 105 or the computing unit 110) is configured to transmit, over a network, service level data (e.g., destination address/geo-coordinates, asset dimensions, asset weight, delivery instructions, etc.) to the delivery bot to complete one or more shipping operations, as described, for example, with respect to the UGV 600 of FIG. 6 or FIG. 4. For example, the logistics server(s) 105 or the logistics vehicle 120 may be communicatively coupled to a delivery bot such that the logistics server(s) 105 or the logistics vehicle 120 transmits the geo-coordinates to the delivery bot, which his indicative of where the delivery bot needs to traverse and unload a particular package to. In an illustrative example, referring back to FIG. 5A, the logistics vehicle 520 or the logistics server(s) 105 may send a wireless control signal to the delivery bot 508 to delivery an asset (which is has been loaded by the apparatus 545 and stored to the delivery bot 508) outside of the logistics vehicle 520 (e.g., via the platform 506 and traversing through the aperture 550) to a particular latitude and longitude geo-coordinate such that upon arrival to these geo-coordinates, the delivery bot 508 unloads the asset at or near the geo-coordinates, as described, for example, with respect to FIG. 6.

In some embodiments, the logistics vehicle includes a sensor (e.g., a lidar sensor) that maps out a geographical environment that the logistics vehicle traverses to guide the delivery bot to perform the one or more shipping operations, as described for example, with respect to FIG. 4 and/or FIG. 6. In an illustrative example, the logistics vehicle may include a radar and/or object detection camera that maps out an environment and stores the information in a file. This file (or information in the file) can then be transmitted to a delivery bot such that the delivery bot uses the file or information from the file to traverse to the appropriate location for delivery. Alternatively, or additionally, the delivery bot itself may include these same sensors or other sensors to detect the environment that it is in and traverse to a delivery location.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "Includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the logistics server(s) 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The term "coupled" to refers to two or more components being attached, fixed, or otherwise connected. Any suitable component can be used to couple components together, such as one or more: screws, bolts, nuts, hook fasteners, nails, etc.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A system comprising: a plurality of storage units that are configured to receive one or more assets associated with performing one or more shipment operations; and a conveyor apparatus that is configured to relay the one or more assets, wherein a first asset of the one or more assets is configured to be picked from the conveyor apparatus and loaded onto at least one storage unit of the plurality of storage units for the one or more shipment operations, the conveyor apparatus being communicatively coupled to the plurality of storage units or communicatively coupled to one or more computing devices associated with the plurality of storage units; wherein the at least one storage unit of the plurality of storage units is configured to automatically rotate to a loading location at least partially in response to receiving a communication from the conveyor apparatus or the one or more computing devices indicating an identifier associated with the first asset.

Clause 2. The system of clause 1, wherein the plurality of storage units are located in a logistics vehicle, and wherein the logistics vehicle is configured to carry a plurality of assets associated with the one or more shipment operations.

Clause 3. The system of clause 1, wherein the plurality of storage units are located on a platform adjacent to a logistics vehicle and the conveyor apparatus.

Clause 4. The system of clause 3, wherein the plurality of storage units are configured to be loaded into the logistics vehicle at least partially in response to the loading of the first asset into the at least one storage unit.

Clause 5. The system of clause 1, further comprising a robotic arm component that is configured to perform the loading of the first asset into that least one storage unit of the plurality of storage units.

Clause 6. The system of clause 1, wherein a user operator performs the loading of the first asset into the at least one storage unit of the plurality of storage units.

Clause 7. The system of clause 1, further comprising one or more buffer shelves that are configured to receive a set of assets based on the set of assets sharing a same destination location as part of a final mile delivery.

Clause 8. A conveyor apparatus comprising: a rotating component that is configured to cause movement of one or more assets for loading the one or more assets into one or more storage units; a reader component configured to obtain an identifier associated with the one or more assets; and a transmitting component configured to transmit, over a computer network, the identifier obtained by the reader component to the one or more storage units or one or more computing devices associated with the one or more storage units, wherein the one or more storage units are configured to rotate to a loading location for the loading of the one or more assets in response receiving the identifier.

Clause 9. The conveyor apparatus of clause 8, wherein the transmitting, over the computer network, of the identifier occurs via a wireless communication link between the conveyor apparatus, a computing device, and a logistics vehicle that is configured to store the one or more storage units.

Clause 10. The conveyor apparatus of clause 8, wherein the transmitting, over the computer network, of the identifier occurs via a wired connection link between the conveyor apparatus and the one or more storage units.

Clause 11 The conveyor apparatus of clause 8, wherein the one or more storage units are located in a logistics vehicle, and wherein the logistics vehicle is configured to carry a plurality of assets associated with one or more shipment operations.

Clause 12. The conveyor apparatus of clause 8, wherein the one or more storage units are located on a platform adjacent to a logistics vehicle and the conveyor apparatus.

Clause 13. The conveyor apparatus of clause 12, wherein the one or more storage units are configured to be loaded into the logistics vehicle in response to the loading of the one or more assets into the one or more storage units.

Clause 14. The conveyor apparatus of clause 8, wherein a robotic component performs the loading of the one or more assets into the one or more storage units.

Clause 15. A computer-implemented method comprising: obtaining an identifier of one or more assets in response to a reader component reading a tag associated with one or more assets as the one or more assets traverse a conveyor apparatus; and at least partially in response to the obtaining of the identifier, causing a storage unit of a plurality of storage units to automatically rotate to a loading location to receive the one or more assets.

Clause 16. The method of clause 15, wherein the one or more assets include a plurality of assets, the method further comprising populating a queue data structure with the identifier and a plurality of other identifiers associated with other assets, the populating of the queue data structure is at least partially indicative of an order that the plurality of assets are traversing on the conveyor apparatus; and based on the populating, causing, in near-real time relative to the plurality of assets traversing on the conveyor apparatus, each storage unit of the plurality of storage units to rotate to the loading location in an order that the identifier and identifiers are populated in the que data structure.

Clause 17. The method of clause 16, wherein the causing the storage unit of the plurality of storage units to automatically rotate includes sending a control signal to the storage unit that rotates the storage unit to the loading location based at least in part on the identifier and the order the identifier is populated in the queue data structure.

Clause 18. The method of clause 15, wherein the plurality of storage units are located on a platform adjacent to a logistics vehicle and the conveyor apparatus.

Clause 19. The method of clause 15, wherein the plurality of storage units are configured to be loaded into the logistics vehicle in response to the loading of the one or more assets into the storage unit.

Clause 20. The method of clause 15, wherein a robotic component is configured to perform the loading of the one or more assets into the storage unit of the plurality of storage units.

Clause 21. The method of clause 15, wherein a user operator performs a loading of a first asset into a storage unit of the plurality of storage units.

Clause 22. The method of clause 15, further comprising receiving, via one or more buffer shelves, a set of assets based on the set of assets sharing a same destination location as part of a final mile delivery.

Clause 23. A system comprising: a plurality of storage units that are configured to receive one or more assets associated with performing one or more shipment operations; wherein the plurality of storage units are further configured to be placed inside and outside of a logistics vehicle for a loading or picking of the one or more assets; and wherein the plurality of storage units include one or more fastening components that are configured to allow the plurality of storage units to be coupled together and the one or more fastening components further allow at least a portion of the plurality of storage units to pivot about an axis.

Clause 24. The system of clause 23, further comprising: a conveyor apparatus that is configured to relay the one or more assets, wherein a first asset of the one or more assets is configured to be picked from the conveyor apparatus and loaded onto at least one storage unit of the plurality of storage units for the one or more shipment operations.

Clause 25. The system of clause 24, wherein the conveyor apparatus is communicatively coupled to the plurality of storage units or communicatively coupled to one or more computing devices associated with the plurality of storage units, and wherein the at least one storage unit of the plurality of storage units is configured to automatically rotate to a loading location in response to at least partially receiving a communication from the conveyor apparatus or the one or more computing devices indicating an identity of the first asset.

Clause 26. The system of clause 23, wherein the plurality of storage units are configured to be loaded into the logistics vehicle in response to the loading of a first asset into at least one storage unit.

Clause 27. The system of clause 23, further comprising a robotic arm component that is configured to perform the loading or picking of a first asset into or from at least one storage unit of the plurality of storage units.

Clause 28. The system of clause 23, wherein a user operator performs the loading or picking of the one or more assets.

Clause 29. The system of clause 23, further comprising one or more buffer shelves that are configured to receive a set of assets based on the set of assets sharing a same destination location as part of a final mile delivery.

Clause 30. The system of clause 23, further comprising a conveyor apparatus that is configured to cause movement of one or more assets for loading the one or more assets into the plurality of storage units, wherein the conveyor apparatus is further configured to obtain an identifier of the one or more assets, and wherein the conveyor apparatus is further configured to transmit, over a computer network, the identifier to the plurality of storage units or one or more computing devices associated with the plurality of storage units, and wherein the plurality of storage units are configured to rotate to a loading location for the loading of the one or more assets in response receiving the identifier.

V. CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus for loading one or more assets to a delivery bot, the apparatus aligned over an outside surface of a storage unit, the outside surface defining a boundary of an opening of the storage unit, the apparatus comprising:
   one or more asset loading components outside of the storage unit, the one or more asset loading components including a set of rods that is extendable through the opening of the storage unit between a first surface of the one or more assets and a second surface of the storage unit, the set of rods configured to transfer the one or more assets from the storage unit to the delivery bot based on the set of rods being extendable, the one or more asset loading components not being included in the delivery bot, the one or more asset loading components and the storage unit and the delivery bot are included in a logistics vehicle, the delivery bot is configured to deliver the one or more assets outside of the logistics vehicle to one or more delivery locations in response to transferring of the one or more assets from the storage unit to the delivery bot; and
   one or more sensors configured to automatically guide the set of rods to the one or more assets for the transferring of the one or more assets from the storage unit to the delivery bot.

2. The apparatus of claim 1, wherein each rod of the set of rods include an extension that is configured to catch the one or more assets for the transferring of the one or more assets from the storage unit to the delivery bot.

3. The apparatus of claim 2, further comprising an actuator component configured to place at least a portion of the set of rods over a top portion of the one or more assets and cause a rotation of the extension such that the extension catches an edge of the one or more assets.

4. The apparatus of claim 3, wherein the rotation includes causing rotation of the extension from being substantially parallel with a horizontal edge of a top of the one or more assets to a position that is substantially perpendicular to the horizontal edge of the one or more assets.

5. The apparatus of claim 1, further comprising one or more stopper components that are configured to prevent other assets from being moved to the delivery bot.

6. The apparatus of claim 1, wherein each rod of the set of rods is configured to move independently from another rod for the transferring of the one or more assets such that the set of rods does not perform a same movement at a same time.

7. The apparatus of claim 1, wherein the apparatus is disposed over each boundary of a slot that includes the storage unit, and wherein the slot is rotatable such that another slot is configured to rotate to the one or more asset loading components to move other assets to the delivery bot.

8. A system comprising:
   a logistics vehicle that includes one or more storage units, the logistics vehicle is configured to carry one or more assets for one or more shipping operations; and
   an apparatus coupled to one or more slots that define one or more openings of the one or more storage units, the apparatus included in the logistics vehicle, the apparatus coupled to one or more asset loading components, the one or more asset loading components including a set of rods that is extendable through an opening of the one or more storage units between a first surface of the one or more assets and a second surface of the one or more storage units, the set of rods configured to automatically transfer the one or more assets to or from the one or more storage units to or from an Unmanned Ground Vehicle (UGV) inside of the logistics vehicle, the UGV including a set of wheels, the UGV configured to deliver the one or more assets to or from one or more delivery or pickup locations outside of the logistics vehicle.

9. The system of claim 8, wherein the logistics vehicle includes a plurality of delivery bot storage racks that are each configured to receive a respective UGV, and wherein each of the plurality of delivery bot storage racks is vertically aligned one with another at a rear portion of the logistics vehicle.

10. The system of claim 9, further comprising: a ramp configured to extend between a ground surface and a bottom portion of an inside of the logistics vehicle, the ramp is configured to allow the UGV to traverse outside of the logistics vehicle or inside of the logistics vehicle in order to complete the one or more shipping operations, wherein the ramp is configured to raise and lower in a vertical plane to each of the one or more slots to receive the respective UGV.

11. The system of claim 10, wherein the ramp includes a first end that is configured to lower from the logistics vehicle to the ground surface beneath the logistics vehicle.

12. The system of claim 8, wherein the logistics vehicle or a computing device is configured to transmit, over a network, service level data to the UGV to complete the one or more shipping operations.

13. The system of claim 8, wherein the apparatus performs the automatically transfer of the one or more assets to or from the one or more storage units to or from the UGV inside of the logistics vehicle in response to the one or more storage units rotating to a position adjacent to the apparatus.

14. The system of claim 8, wherein the logistics vehicle includes a sensor that maps out a geographical environment that the logistics vehicle traverses to guide the UGV to perform the one or more shipping operations.

15. A method for loading one or more shipment assets to or from a delivery bot, the method comprising:
   automatically transferring, by an apparatus, one or more assets from one or more storage locations to the delivery bot by sliding a set of rods, of the apparatus, into the one or more storage locations between a first surface of the one or more assets and a second surface inside the one or more storage locations and then pulling, via the set of rods, the one or more assets onto the delivery bot, the apparatus and the one or more storage locations and the delivery bot are stored in a logistics vehicle, the apparatus being aligned over the one or more storage locations, the delivery bot is configured to deliver the one or more assets to one or more delivery or pickup locations that are outside of the logistics vehicle, the apparatus not being included in the delivery bot.

16. The method of claim 15, wherein the sliding and pulling of the set of rods occurs in response to a vision sensor located on the apparatus sensing contours of the one or more assets and guiding the set of rods to the one or more assets for the transferring of the one or more assets.

17. The method of claim 15, further comprising preventing other assets from being moved to or from the delivery bot.

18. The method of claim 15, wherein the transferring of the one or more assets includes moving the set of rods independently one from another.

19. The method of claim 15, further comprising automatically rotating, prior to the transferring of the one or more assets, the one or more storage locations to a position adjacent to the apparatus in order to place or pick up the one or more assets from the one or more storage locations.

* * * * *